US008300512B2

(12) United States Patent
Tao et al.

(10) Patent No.: US 8,300,512 B2
(45) Date of Patent: Oct. 30, 2012

(54) LIQUID CRYSTAL ELEMENT, OPTICAL HEAD DEVICE, AND VARIABLE OPTICAL MODULATION ELEMENT

(75) Inventors: Yukihiro Tao, Koriyama (JP); Kenichi Yuyama, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/823,162

(22) Filed: Jun. 25, 2010

(65) Prior Publication Data
US 2010/0260030 A1 Oct. 14, 2010

Related U.S. Application Data

(63) Continuation of application No. PCT/JP2008/073651, filed on Dec. 25, 2008.

(30) Foreign Application Priority Data

Dec. 27, 2007 (JP) .................................. 2007-336725

(51) Int. Cl.
*G11B 7/00* (2006.01)
(52) U.S. Cl. ............... 369/112.02; 369/112.03; 349/201
(58) Field of Classification Search ............. 369/112.01, 369/112.02, 112.03, 112.05; 349/201, 33; 359/322, 272
See application file for complete search history.

(56) References Cited

U.S. PATENT DOCUMENTS

| 4,729,640 | A * | 3/1988 | Sakata | 349/201 |
| 6,580,674 | B1 * | 6/2003 | Nishiyama et al. | 369/112.01 |
| 6,584,059 | B1 * | 6/2003 | Saimi et al. | 369/112.02 |
| 6,618,343 | B1 * | 9/2003 | Saitoh et al. | 369/112.01 |
| 7,623,291 | B2 * | 11/2009 | Sato | 359/569 |
| 2005/0226122 | A1 * | 10/2005 | Ooi et al. | 369/112.05 |
| 2006/0227283 | A1 * | 10/2006 | Ooi et al. | 349/201 |
| 2006/0280100 | A1 * | 12/2006 | Ooi et al. | 369/112.02 |
| 2007/0146625 | A1 * | 6/2007 | Ooi et al. | 349/200 |
| 2007/0182915 | A1 * | 8/2007 | Osawa et al. | 349/201 |
| 2007/0183293 | A1 * | 8/2007 | Murata et al. | 369/112.02 |

FOREIGN PATENT DOCUMENTS

| JP | 06-52348 | 6/1994 |
| JP | 06-208089 | 7/1994 |
| JP | 08-278477 | 10/1996 |
| JP | 2005-003758 | 1/2005 |
| JP | 2005-353207 | 12/2005 |
| JP | 2006-048818 | 2/2006 |
| JP | 2006-252638 | 9/2006 |
| WO | 2005/106571 | 11/2005 |

* cited by examiner

*Primary Examiner* — Thomas Alunkal
(74) *Attorney, Agent, or Firm* — Oblon, Spivak, McClelland, Maier & Neustadt, L.L.P.

(57) ABSTRACT

A liquid crystal element includes: a transparent substrate; and a liquid crystal layer including: a liquid crystal material; and a concavo-convex portion including periodic concaves and convexes, wherein the concavo-convex portion is aligned so that a longitudinal direction of liquid crystal molecules that are positioned on a side of the transparent substrate and on a concavo-convex surface that is an interface of the concavo-convex portion substantially becomes a vertical direction with respect to a concavo-convex surface on the side of the transparent substrate, or a longitudinal direction of liquid crystal molecules that are positioned on a side, in which a medium is disposed and which is opposite to the transparent substrate, and on the concavo-convex surface that is the interface of the concavo-convex portion substantially becomes the vertical direction with respect to a concavo-convex surface on the side, in which the medium is disposed, to form a diffraction grating.

13 Claims, 12 Drawing Sheets

LIQUID CRYSTAL ELEMENT, OPTICAL HEAD DEVICE, AND VARIABLE OPTICAL MODULATION ELEMENT

TECHNICAL FIELD

The present invention relates to a liquid crystal element having a diffraction grating structure using liquid crystals, an optical head device that performs recording/reading of information on an optical recording medium such as an optical disk or the like using the liquid crystal element, and a variable optical modulation element that varies the light quantity of transmitted light with respect to incident light using the liquid crystal element.

BACKGROUND ART

A diffraction grating using liquid crystals can be used as an optical device having polarization dependence, which emits light with different optical characteristics in accordance with a polarization state of incident light by using the refractive index anisotropy that the liquid crystals have, i.e. a difference Δn between the refractive index $n_o$ for ordinary light and the refractive index $n_e$ for extraordinary light. For example, as illustrated in FIG. 1, in a liquid crystal element 10 having two parallel transparent substrates 11a and 11b, one transparent substrate 11a has a diffraction grating 14 in which a cross section of one surface of the transparent substrate 11a is in a periodic concavo-convex shape, and is arranged opposite to the other transparent substrate 11b. Further, an alignment layer 12a formed on the surface of the transparent substrate 11a is arranged opposite to an alignment layer 12b formed on the surface of the transparent substrate 12a, and a liquid crystal layer 13 filled with a liquid crystal material is placed in a gap between the two transparent substrates. Polyimide, which is an organic material, is appropriately used as the alignment layer. Particularly, a method of providing an alignment layer by rubbing a surface on which polyimide is formed and adjusting the alignment direction of liquid crystal molecules which are in contact with the surface of the alignment layer has been known. Also, an oblique deposition method that performs deposition of an alignment layer of an inorganic material such as $SiO_2$ on the surface of the opposite substrate in a predetermined slanting direction from the normal line of the substrate surface has been known.

In this case, the liquid crystal layer 13 is made using, for example, a liquid crystal material having positive dielectric anisotropy, the longitudinal direction of liquid crystal molecules of the liquid crystal material is approximately level with the transparent substrate surface and is in a direction that is parallel to the length direction (Y-axis direction) of the concavo-convex of the diffraction grating 14, and the refractive index $n_s$ of the transparent substrate 11a made of an isotropic optical material is made approximately consistent with the refractive index $n_o$ for ordinary light of the liquid crystals. If light that travels in parallel to the Z-axis direction is incident to the liquid crystal element 10, the light polarized in X-axis direction does not realize the difference in refractive index between $n_o$ and $n_s$ and thus is transmitted straight through the liquid crystal element with almost no diffraction, while the light polarized in Y-axis direction realizes a difference in refractive index between $n_e$ and $n_s$ and thus diffraction phenomenon is revealed. In the liquid crystal element that creates the polarization dependence, the alignment state of the liquid crystals may be changed by arranging a further transparent conductive layer such as ITO or the like between the liquid crystals and applying an AC voltage to the conductive layer. Also, the liquid crystals may be made of a material having the characteristic of positive dielectric anisotropy or a material having the characteristic of negative dielectric anisotropy, and the liquid crystal materials, the alignment methods, and the like, may be combined in accordance with the optical uses. In this case, a concave portion 15 and a convex portion 16 of the diffraction grating (corresponding to concavo-convex portions) 14 indicate a concave portion and a convex portion of the liquid crystal layer 13. Unless specifically explained in the liquid crystal element according to an embodiment of the present invention, the concave portion and the convex portion mean the concave portion and the convex portion of the liquid crystal layer in all.

In the diffraction grating structure, if the length of one period of the concavo-convex portion (hereinafter referred to as "grating pitch") is decreased (or shortened), the diffraction angle (i.e. the angle between the Z-axis direction and the diffraction direction) of the light, which travels and is incident in the Z-axis direction of the FIG. 1 and is polarized in parallel to the Y-axis direction, is extended. In this case, for example, the light, which is polarized in parallel to the X-axis direction in which no diffraction occurs, is incident to another optical device that is arranged in direct transmission direction at high transmission rate. On the other hand, the light, which is polarized in parallel to the Y-axis direction, is diffracted at high diffraction angle and thus is not to be incident to other optical devices to heighten the extinction ratio of the light that is transmitted in the straight direction. Also, by extending the diffraction angle, for example, the diffracted light becomes stray light which is difficult to be incident to other optical devices arranged in the straight direction, and thus the quality of the optical system is heightened.

Next, it is exemplified that the liquid crystal element 10 is arranged in an optical head device 20 as shown in FIG. 2. The light that is emitted in the direction of an optical disk 25 through direct polarization of the light source 21 in the X-direction is transmitted through the liquid crystal element 10 without diffraction. The light, which becomes a parallel light through a collimator lens 22, is transmitted through a ¼ wavelength plate 23 to be a circularly polarized light that turns to the right, and reaches an information recording surface 25a of the optical disk 25 after being condensed by an object lens 24. The light reflected from the information recording surface 25a is transmitted through the object lens 24 as the circularly polarized light that turns to the left, becomes a linear polarized light in the Y direction by the ¼ wavelength plate 23, and then is diffracted by the liquid crystal element 10 to reach a light receiving device 26. At this time, since the diffraction angle becomes larger as the grating pitch of the liquid crystal element 10 is narrower, the reflected light, if the diffracted light can be deflected to have a large diffraction angle, may not be a stray light with respect to, for example, a semiconductor laser that is the light source 21.

Next, it is considered that the liquid crystal element 10 is designed by specifying the phase difference (i.e. length difference between light paths) of the transmitted light. If the liquid crystal molecules are uniformly aligned within the liquid crystal layer 13, the length difference between the optical paths is realized by adjusting a liquid crystal material and the depth of the diffraction grating. The length difference between the optical paths when the light that travels in the Z-axis direction is transmitted through the concave portion 15 and the convex portion 16 can be explained as follows. It is assumed that the refractive index for ordinary light of the liquid crystal material with respect to the wavelength λ of the incident light is $n_o$, the refractive index for extraordinary light is $n_e$, the refractive index of a grating material composed of an isotropic material is $n_s$, and a difference in refractive index between the liquid crystal material and the grating material is $\Delta n_o=|n_o-n_s|$, $\Delta n_e=|n_e-n_s|$. In this case, if the light in an ordinary-light direction of the liquid crystal material, i.e. in a fast axis direction, is incident, the length difference between optical paths that occurs in the diffraction grating having a grating depth d becomes $\Delta n_o \cdot d$, and if the light in extraordinary-light direction of the liquid crystal material, i.e. in slow axis direction, is incident, the length difference between optical paths that occurs in the diffraction grating having a grating depth d becomes $\Delta n_e \cdot d$. For example, on condition that the phase difference is $(2m+1)\lambda/2$ (where, m is an integer that is equal to or larger than 0) in order to heighten the diffraction efficiency of ±1-order diffracted light in the tetragonal diffraction grating, it is preferable to adjust the grating depth d by specifying the liquid crystal material. By doing this, the kinds of usable liquid crystal materials can be increased. If the alignment state is not uniform in the liquid crystal layer, the depth of the diffraction grating or the like may be adjusted in accordance with the alignment state to cope with the non-uniform alignment state.

Also, when the light having a wavelength $\lambda$ is vertically incident to the surface of the liquid crystal element having a diffraction grating of the grating pitch P as relations between the grating pitch of the diffraction grating and the diffraction angle, the diffraction angle θ of the Q-order diffracted light against the normal line of the surface of the liquid crystal element (=light traveling direction) becomes as in Equation (1).

$$\sin \theta = Q\lambda/P \text{ (where, } Q=\pm 1, \pm 2, \ldots) \quad (1)$$

From this, for example, if the diffraction angle is enlarged with respect to the light having a short wavelength, for example, such as 400 nm band that is adapted to an optical head device for a high-density DVD, it is necessary to further narrow the grating pitch. Also, the concavo-convex portion of the diffraction grating is not limited to a tetragonal shape, and may be in a blazed grating shape or in a shape in which the blaze is formed to approximate the shape of stairs. In this case, the light quantity of the diffracted light in one direction may be extended to heighten the optical use efficiency.

In the above-described diffraction grating, the diffraction angle can be extended by making the grating pitch, for example, equal to or less than 10 μm (i.e. several μm) to meet the wavelength of the incident light. However, in the case of forming an alignment layer on the diffraction grating by a rubbing method in the related art, the fiber for rubbing is not sufficiently in contact with the groove (that is the portion contacting the convex portion 16 of the liquid crystal layer) of the transparent substrate 11a due to the narrow grating pitch, and thus the anchoring force becomes insufficient. Accordingly, the liquid crystal molecules on the surface of the convex portion 16 of the liquid crystal layer are not sufficiently aligned to cause the occurrence of alignment non-uniformity. Also, the fiber of a rubbing cloth is generally in the range of several tens of μm, and thus it is difficult to control the alignment of the liquid crystal molecules by rubbing the diffraction grating structure having the grating pitch in the range of several tens of μm, and particularly, equal to or less than 20 μm. Due to this, there is a problem that the optical characteristics such as diffraction efficiency of the light incident to the liquid crystal element, the polarization state of the diffracted light, and the like, cannot be stably obtained.

In order to reduce the influence of the alignment non-uniformity as described above, Patent Document 1 discloses a method for forming an alignment layer on a transparent conductive layer and forming a diffraction grating pattern thereon by an electron-beam resist. In this method, the alignment layer is exposed from a portion from which the resist is removed, and liquid crystal molecules which are in contact with the alignment layer are vertically aligned.

Also, as a method for obtaining a grating pitch of several μm without rubbing, a method of aligning liquid crystals using an imprint method which is a forming process technology which transfers the concavo-convex pattern of a grating pitch of several μm onto a resin layer by pressing a stamper, in addition to a method of straightly processing a substrate surface by photolithography and etching. The imprint method may be a thermal curing type thermal imprint method or an optical imprint method for curing a resist material by illuminating ultraviolet rays. In Patent Document 2, a liquid crystal element and a method of manufacturing the liquid crystal element, which forms a transparent conductive layer on the surface of a diffraction grating of a grating pitch of several μm, interposes liquid crystals between flat substrates having transparent conductive layers opposite to each other, and aligns the liquid crystal molecules by applying a voltage thereto to form polymer liquid crystals, have been reported. In this method, it is not necessary to form an alignment layer, and thus the alignment non-uniformity due to rubbing does not occur.

Patent Document 1: JP-B-6-052348
Patent Document 2: JP-A-2005-353207

DISCLOSURE OF THE INVENTION

Problem that the Invention is to Solve

However, in Patent Document 1, since the liquid crystal layer which includes a portion that is in contact with the diffraction grating is uniformly aligned, the difference in length between paths of light that is transmitted through a concave portion and a convex portion using the diffraction grating pattern depends upon only the depth of the groove of the diffraction grating. Due to this, in order to adjust the difference in length between the light paths, it is necessary to accurately form the depth of the groove of the diffraction grating, and thus the processing for this is not easy. Further, since the whole diffraction grating surface is not alignment-processed, the alignment non-uniformity of the liquid crystals may easily occur when no voltage is applied thereto. Accordingly, the transmittance deteriorates, the light emitted to the diffraction grating is not in an expected polarization state, or the desired diffraction efficiency is not obtained.

Also, in Patent Document 2, by attaching a taper to a grating, the direction of an electric field is made to have an inclined angle with respect to the light incident direction, and birefringence of the liquid crystals is used. Accordingly, only the refractive index anisotropy, which is considerably smaller than the refractive index anisotropy that the liquid crystals themselves have, can be used, and the processing of the grating is not easy since the depth of the groove of the grating is liable to be greatly extended. Further, in Patent Document 2, since the liquid crystal layer is composed of polymer liquid crystals, it is not necessary to apply an external voltage to the liquid crystal element having polymer liquid crystals. Due to this, the transparent conductive layer and insulating layer between which the polymer liquid crystals are interposed cause the transmittance of the incident light to deteriorate, and the light use efficiency also deteriorates. Also, since the transparent conductive layer is applied to not only the bottom surface of the concave portion of the transparent substrate 11a (a portion that is in contact with an upper surface of the convex portion 16 of the liquid crystal layer) but also the side surface of the concave portion of the transparent substrate 11a, the alignment state of the liquid crystals when a voltage is applied to the liquid crystal layer is not consistently in parallel to the thickness direction of the liquid crystal layer. Particularly, since it is difficult for the alignment state of the liquid crystals to be consistently in parallel to the thickness direction of the liquid crystal layer as the grating pitch becomes narrower, it is difficult to control the length of the path of the light that is transmitted through the concave portion (i.e. groove portion) of the diffraction grating in which polymer liquid crystals are filled.

The present invention has been made to solve the above-described problems in the related art, and an object of the present invention is to provide a liquid crystal element which heightens the liquid crystal alignment anchoring force of the concavo-convex portion, facilitates the control of the length of the path of light that is incident to the liquid crystal element, and has a good productivity by aligning the liquid crystals without applying a voltage thereto and making the alignment direction approximately perpendicular to the concavo-convex surface of a diffraction grating.

Means For Solving the Problem

According to the present invention, there is provided a liquid crystal element including: a transparent substrate; and a liquid crystal layer including: a liquid crystal material; and a concavo-convex portion including periodic concaves and convexes, wherein the concavo-convex portion is aligned so that a longitudinal direction of liquid crystal molecules that are positioned on a side of the transparent substrate and on a concavo-convex surface that is an interface of the concavo-convex portion substantially becomes a vertical direction with respect to a concavo-convex surface on the side of the transparent substrate to form a diffraction grating, or the concavo-convex portion of the liquid crystal layer is aligned so that a longitudinal direction of liquid crystal molecules that are positioned on a side, in which a medium is disposed and which is opposite to the transparent substrate, and on the concavo-convex surface that is the interface of the concavo-convex portion substantially becomes the vertical direction with respect to a concavo-convex surface on the side, in which the medium is disposed, to form a diffraction grating.

By this configuration, since the liquid crystal molecules are approximately vertically aligned with respect to not only the bottom surface of a groove of the concavo-convex portion that forms the diffraction grating but also the wall surface thereof, a sufficient alignment anchoring force is obtained even in a case where the grating pitch is narrow, and thus a liquid crystal element having high-quality optical characteristics can be realized. Also, even if the grating pitch becomes smaller than the degree of the wavelength of the incident light, the degree of polarization is heightened, the wavelength dispersion becomes superior, and the aspect ratio is reduced by the birefringence of the liquid crystals themselves in comparison to a form birefringence device using a typical isotropic material. Accordingly, a form birefringence device can be easily manufactured without the necessity of high processing precision. Also, in the interface between a birefringence material and an isotropic material, the refractive index can be continuously changed according to the alignment distribution of the liquid crystal molecules, and thus a structure which suppresses the polarization dependence and obtains antireflection effect can be manufactured. Also, in the case where the grating pitch becomes larger than the wavelength degree of the incident light, a polarized diffraction grating having high polarization dependence can be manufactured. Further, by controlling the refractive index of a portion that is different from the diffraction grating (i.e. the concavo-convex portion) in the liquid crystal layer by the above-described configuration, the height and the refractive index of the concavo-convex portion can be controlled, and the diffraction efficiency of the light incident in the vertical direction and the diffraction efficiency of the light incident in the horizontal direction against the alignment direction of the liquid crystals can be independently controlled.

Further, the present invention can provide the liquid crystal element, wherein: the medium is a transparent substrate; and the liquid crystal layer is filled and is leveled by a pair of the transparent substrates.

By this configuration, the liquid crystal layer is interposed between the transparent substrates having high rigidity, and thus the mechanical reliability of the liquid crystal element can be improved.

Further, the present invention can provide the liquid crystal element, wherein: a surface of the liquid crystal layer, which is opposite to a surface on which the concavo-convex portion is provided, is level; and the liquid crystal molecules on the surface of the liquid crystal layer are uniformly aligned. Further, the present invention can provide the liquid crystal element, wherein the liquid crystal molecules on the surface of the liquid crystal layer are aligned substantially in a horizontal direction with respect to the surface of the liquid crystal layer.

By this configuration, so called hybrid alignment, in which longitudinal direction of the liquid crystal molecules of the concave portion in the liquid crystal layer is changed in the thickness direction of the liquid crystal layer, can be obtained. On the other hand, since the longitudinal direction of the liquid crystal molecules of the convex portion in the liquid crystal layer can be kept almost constant, the difference in length between light paths of the concave portion and the convex portion is optically extended with respect to the light that travels in the thickness direction of the liquid crystal layer. Due to this, a large difference in length between light paths can be obtained even without extending the aspect ratio, which is indicated as the ratio of the thickness of the convex portion to the grating pitch, and high processing precision is not necessary in manufacturing the diffraction grating to reduce the burden of the manufacturing processes.

Further, the present invention can provide the liquid crystal element, wherein: the surface, on which the concavo-convex portion of the liquid crystal layer, includes a plurality of regions; a period direction of the concavo-convex portion of each region differs, or a concavo-convex direction of the concavo-convex portion of the liquid crystal layer is distributed to be continuously changed; and the liquid crystal molecules on a surface of the liquid crystal layer are aligned substantially in a vertical direction with respect to the surface.

By this configuration, the polarization state of each region can be changed with respect to the incident random light, and the light of the component that is orthogonal to the component of the light emitted to each region can be diffracted and emitted. Also, in the case where the opposite substrate side is horizontally aligned, in order to obtain this function, the patterning of the alignment processing is necessary so that the alignment is performed in different directions according to the regions. Further, since the characteristic deteriorates by the mismatch caused by the overlapping of a substrate having a diffraction grating on a substrate opposite to the substrate and accuracy in overlapping is necessary, which is difficult to actually manufacture, the overlapping accuracy and the patterning of the alignment processing become unnecessary by this configuration. The "substantially vertical" is expressed as "approximately vertical", and the "substantially horizontal" is expressed as "approximately horizontal".

Further, the present invention can provide the liquid crystal element, wherein the medium of the concavo-convex portion of the liquid crystal layer is formed of an isotropic material, and a refractive index of the isotropic material is substantially the same as a refractive index $n_o$ for ordinary light or a refractive index $n_e$ for extraordinary light of the liquid crystals.

By this configuration, the liquid crystal element has the polarization dependence with respect to the incident light, and thus can be used as an optical device such as a polarization filter, a deflection separation device, or the like.

Further, according to the present invention, there is provided an optical head device including: a light source; an object lens configured to condense an emitted light from the light source onto an optical recording medium; an optical detector configured to receive the emitted light which is condensed and reflected by the optical recording medium; and the above liquid crystal element, which is arranged within a light path between the light source and the optical recording medium or within a light path between the optical recording medium and the optical detector.

This configuration can be used as a liquid crystal element which almost transmits the light that is a light path through which the light is directed from the light source to the optical disk, and diffracts the light that is a light path through which the light reflected from the optical disk is directed to the optical detector so that the light reaches the optical detector. Also, since this configuration has the polarization dependence, it can function as a polarization filter that almost directly transmits one of two orthogonal light components and diffracts the other light component.

Further, according to the present invention, there is provided a variable optical modulation element including: a liquid crystal cell in which liquid crystals are interposed between a pair of transparent substrates; the above liquid crystal element; and a voltage control device configured to change an alignment state of the liquid crystals by applying a voltage to the liquid crystals.

By this configuration, the polarization state of the incident light is changed according to the level of the voltage applied to the liquid crystal cells, and of the incident light, the light in the first polarization direction is directly transmitted while the light in the second polarization direction that is orthogonal to the first direction is diffracted. Accordingly, for example, by adjusting the voltage applied to the liquid crystal cells, almost 100% of the light in the first polarization direction is incident to the liquid crystal cells to achieve almost 100% of the direct transmittance (i.e. 0-order diffraction efficiency), or almost 100% of the light in the second polarization direction is incident to the liquid crystal element to achieve almost 0% of the direct transmittance (i.e. 0-order diffraction efficiency). Also, high processing accuracy of the concavo-convex portion that forms the diffraction grating of the liquid crystal element is not necessary, and thus it is expected to obtain a high extinction ratio of the light directly transmitted.

Advantage of the Invention

According to the present invention, since the liquid crystals are substantially vertically aligned with respect to the surface of the concavo-convex portion (i.e. the concavo-convex surface) of the diffraction grating that is in contact with the liquid crystals, even the diffraction grating having a narrow grating pitch has a sufficient alignment anchoring force, and a diffraction device having good optical characteristics including the diffraction characteristic can be obtained. Further, a liquid crystal element having a superior productivity can be realized.

Figure 1:
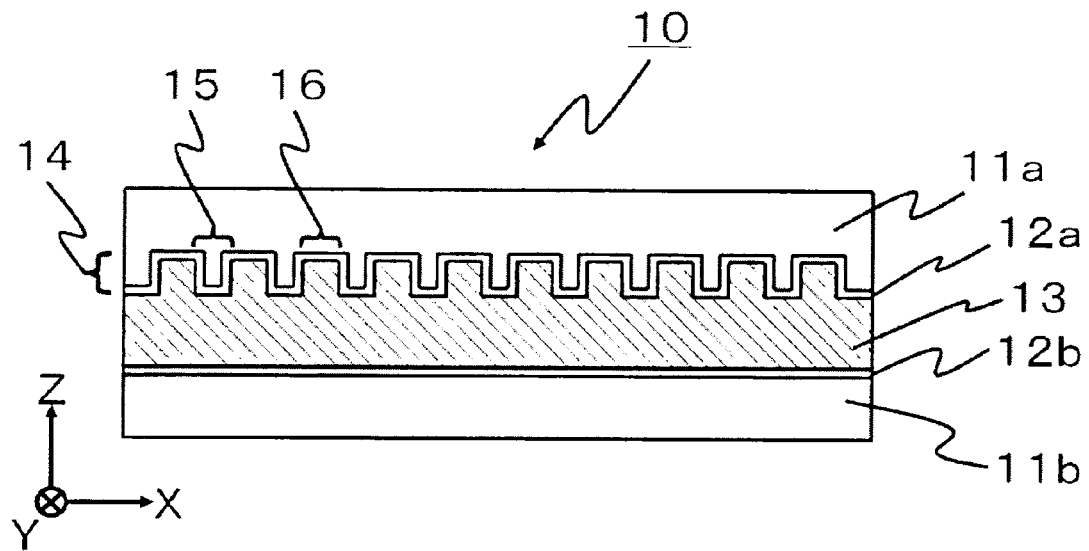
FIG. 1 illustrates a liquid crystal element having a diffraction grating structure.

DESCRIPTION OF REFERENCE NUMERALS AND SIGNS 10, 30a, 30b, 30c, 30d, 40, 45a, 45b, 60a, 60b, 100: LIQUID CRYSTAL ELEMENT
11a, 11b, 31a, 31b, 31c, 31d, 41a, 41b, 46a, 46b, 48a, 48b, 55, 58, 71a, 71b, 92, 101a, 101b: TRANSPARENT SUBSTRATE
12a, 12b, 34, 35, 54, 105, 106: ALIGNMENT LAYER
13, 32, 37, 39, 47, 49, 93, 102: LIQUID CRYSTAL LAYER
14, 36, 38: DIFFRACTION GRATING (CONCAVO-CONVEX PORTION)
15, 43, 61a, 61b: CONCAVE PORTION
16, 44, 62a, 62b: CONVEX PORTION
20, 80: OPTICAL HEAD DEVICE
21: LIGHT SOURCE
22: COLLIMATOR LENS
23: ¼ WAVELENGTH PLATE
24: OBJECT LENS
25: OPTICAL DISK
25a: INFORMATION RECORDING SURFACE
26, 85: LIGHT RECEIVING DEVICE
33: ISOTROPIC OPTICAL MATERIAL
39a, 39b: LIQUID CRYSTAL PORTION
42, 72: LIQUID CRYSTAL MOLECULES
51: MOLD SUBSTRATE

52: VERTICAL ALIGNMENT PROCESSING MATERIAL LAYER
53: POLYMERIZED LIQUID CRYSTAL LAYER
56: LIQUID CRYSTAL POLYMER LAYER
57: TRANSPARENT POLYMER LAYER
63, 64, 65, AND 66: DIFFRACTION GRATING REGION
81: POLARIZATION FILTER
82: GRATING
83: POLARIZATION BEAM SPLITTER
84: FRONT MONITOR
90: VARIABLE MODULATION DEVICE
91: LIQUID CRYSTAL CELL
94a, 94b, 103a, 103b: TRANSPARENT CONDUCTIVE LAYER
95: SEAL MATERIAL
96: VOLTAGE CONTROL DEVICE
97: CONDENSER LENS
98: LIGHT RECEIVING DEVICE
104: GRATING SHAPE

BEST MODE FOR IMPLEMENTING THE INVENTION

First Embodiment

Figure 3A:
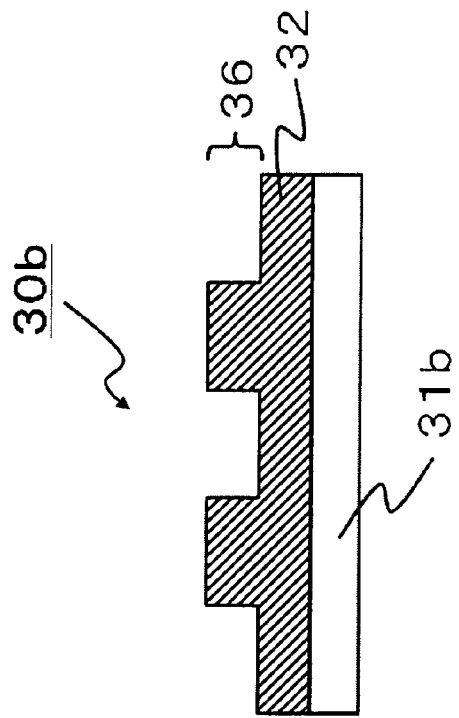
FIGS. 3A to 3D illustrate a liquid crystal element according to a first embodiment and a first example.

FIG. 3A shows a structure of a liquid crystal element 30a according to a first embodiment. In a liquid crystal element 30a, an alignment layer 35 is formed on one surface of one 31b of transparent substrates 31a and 31b arranged in parallel to each other, and a liquid crystal layer 32 is interposed between the substrates. A cross section of an isotropic optical material 33, which is in contact with the transparent substrate 31a, has a diffraction grating structure of a concavo-convex shape, and an alignment layer 34 is further provided on the surface of the concavo-convex portion, in which the liquid crystal layer 32 is filled. The isotropic optical material 33, which is different from the material of the transparent substrate 31a, may not be provided isotropic optical material 33, and the transparent substrate 31a may be processed to have a diffraction grating shape formed thereon. Also, the optical material 33 may be a birefringence material having refractive index anisotropy rather than the isotropic material. Also, the concavo-convex shape is not limited to the diffraction grating having a tetragonal cross section, but may be a multi-step type diffraction grating structure or a blazed type structure. Also, the isotropic optical material 33 may be a material which can be vertically aligned on the grating surface, and it is preferable that the isotropic optical material is a material having the characteristic that is close to the change of the refractive index of the liquid crystal material according to the temperature change. In this case, the portion on which the concavo-convex shape is formed becomes the concavo-convex portion.

The transparent substrates 31a and 31b may be made of acrylic resin, epoxy resin, vinyl chloride resin, polycarbonate, or the like, and it is preferable that the transparent substrate is a quartz substrate or a glass substrate as an inorganic material in consideration of the durability. Also, it is preferable that an anti-reflection (AR) layer is practiced on the surfaces of the transparent substrates 31a and 31b which do not face each other to improve the transmittance.

Figure 3B:
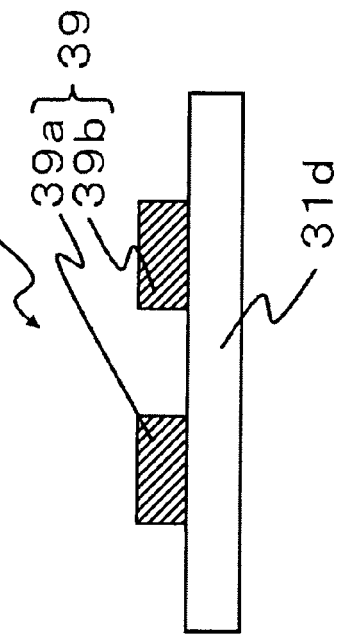
Figure 3C:
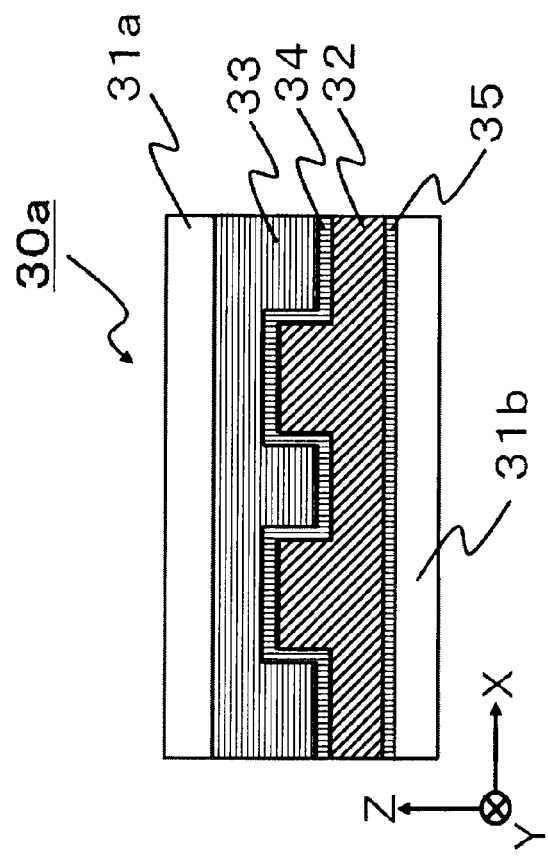
Figure 3D:
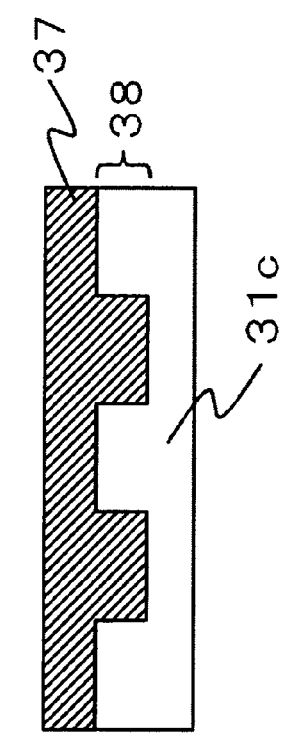

Also, FIGS. 3B, 3C, and 3D are cross sectional diagrams illustrating the structures of the liquid crystal elements 30b, 30c, and 30d, respectively. For example, if demands for the durability of the liquid crystal element itself or the like are not severe, the transparent substrate may be installed only on one side as illustrated, and in this case, the medium on the opposite side to the transparent substrate of the liquid crystal layer may be air. In this case, the superiority in miniaturization and cost of the liquid crystal element can be expected. Also, it is preferable that polymer liquid crystals are used as a liquid crystal material for forming the liquid crystal layer. In this case, although not illustrated in FIGS. 3B to 3D, alignment layers may be formed on the liquid crystal elements 30b, 30c, and 30d.

The liquid crystal element 30b corresponds to a structure excluding the liquid crystal element 30a, the transparent substrate 31a, the isotropic optical material 33, and the liquid crystal layer 32 has a concavo-convex portion (i.e. diffraction grating) 36. Also, the liquid crystal element 30c has a structure in which the transparent substrate 31c has the concavo-convex (shape) in the form of a diffraction grating, and the liquid crystal layer 37 is formed to fill up the concavo-convex and to cover the transparent substrate 31c. The liquid crystal layer 37 has a concavo-convex portion (i.e. diffraction grating) 38. Also, the liquid crystal element 30d has a structure in which liquid crystal portions 39a and 39b are formed on the flat transparent substrate 31d, being apart from each other in the form of a diffraction grating. Even in the case where the liquid crystal portions are spaced apart from each other, the liquid crystal portions 39a and 39b are together defined as a liquid crystal layer 39. In this case, the concavo-convex portion of the liquid crystal element 30d corresponds to the liquid crystal layer 39.

Although not illustrated in the drawing, the liquid crystal element is not limited thereto, and for example, the liquid crystal layer 37 of the liquid crystal element 30c of FIG. 3C may be formed so that the liquid crystal layer is formed to be apart from each other only at the groove portion of the transparent substrate 31c. Further, except for the structure in which the liquid crystal layer is separated into a plurality of liquid crystal portions as shown in the liquid crystal element 30d, the liquid crystal element may be constructed with only the liquid crystal layer having the diffraction grating shape (i.e. concavo-convex portion) formed thereon without installing the transparent substrate. Also, as a manufacturing method in the case where the transparent substrate is not used, for example, release coatings are made on the transparent substrates 31a and 31b, the concavo-convex portion (i.e. diffraction grating) is formed on the liquid crystal layer 32, and then the transparent substrates 31a and 31b are removed, or a liquid crystal monomer is straightly spread on the isotropic optical material 33, air interface of the liquid crystals is uniformly aligned by adding surfactant thereto, and then the liquid crystal layer 32 is formed by curing the liquid crystal monomer.

Further, although not illustrated in the drawing, the liquid crystal layer may be interposed by a transparent conductive layer such as ITO, and a voltage may be applied thereto. In this case, the transmittance is reduced, but the diffraction efficiency can be varied through applying of the voltage. Also, even in the case where the voltage is not applied, the alignment of the liquid crystal becomes stabilized by the alignment anchoring force from the side wall, the upper surface, or the bottom surface of the grating, and thus high-quality variable polarization diffraction device, in which the polarization dependence caused by the alignment non-uniformity or the deterioration of the extinction ratio does not occur regardless of the supply/non-supply of the voltage, can be made. Hereinafter, the liquid crystal element 30a of FIG. 3A will be described.

It is preferable that the liquid crystal material used in the liquid crystal layer 32 is a material which can be controlled to be aligned in approximately vertical or horizontal direction with respect to the contact surface of the alignment layer, and a low molecule liquid crystal composition and a polymerizable liquid crystal composition for forming polymer liquid crystals are used as the liquid crystal material. The alignment layer 34 that is formed on the surface of the diffraction grating is processed so that the liquid crystals are vertically aligned on the surface of the alignment layer, and the alignment layer 35 is processed so that the liquid crystals are horizontally aligned on the surface of the alignment layer. Also, for example, if the isotropic optical material 33 itself is a material that has a vertical alignment capability with respect to the liquid crystals, it is not necessary to form the alignment layer 34 vertically aligned. The alignment layer 35 is not limited to the horizontal alignment processing, and may be vertically aligned. However, it is preferable that the alignment layer 35 is horizontally aligned on the point that it can emphasize the phase step of the diffraction grating structure as described later. In this case, the concavo-convex portion and the diffraction grating are the same, and the interface of the concavo-convex portion of the liquid crystal layer may be a concavo-convex surface or a diffraction grating surface.

Figure 4A:
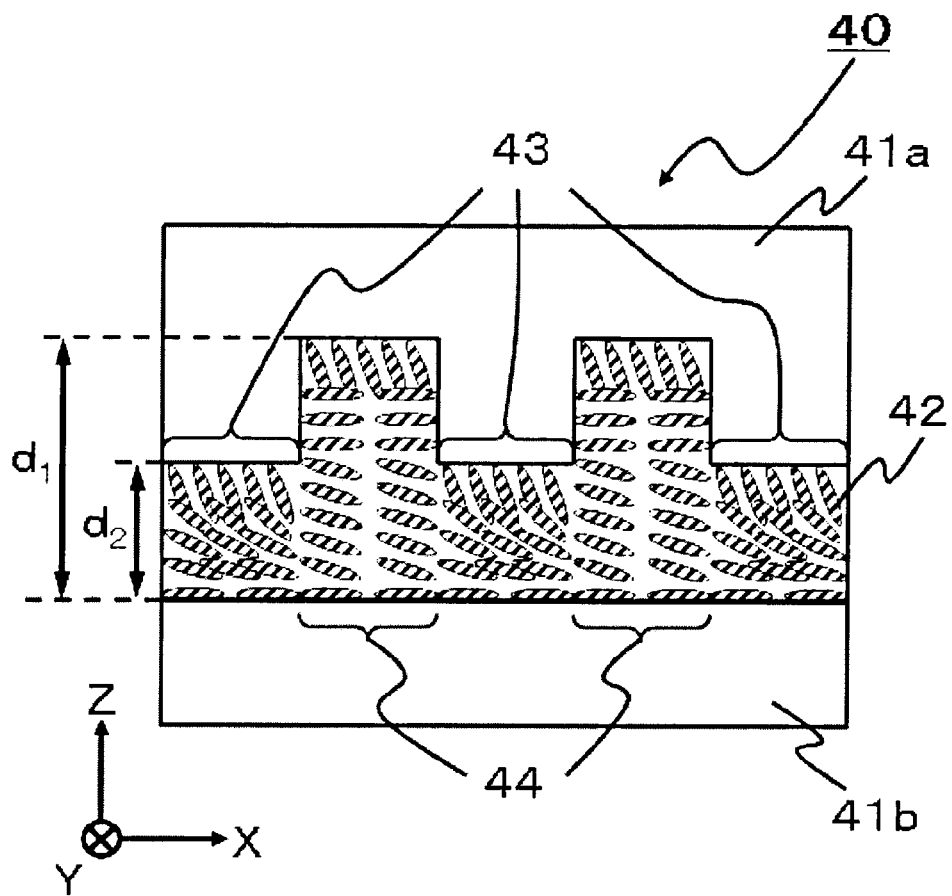
FIGS. 4A and 4B are sectional diagrams illustrating an alignment state in a liquid crystal layer of a liquid crystal element according to the first embodiment.
Figure 4B:
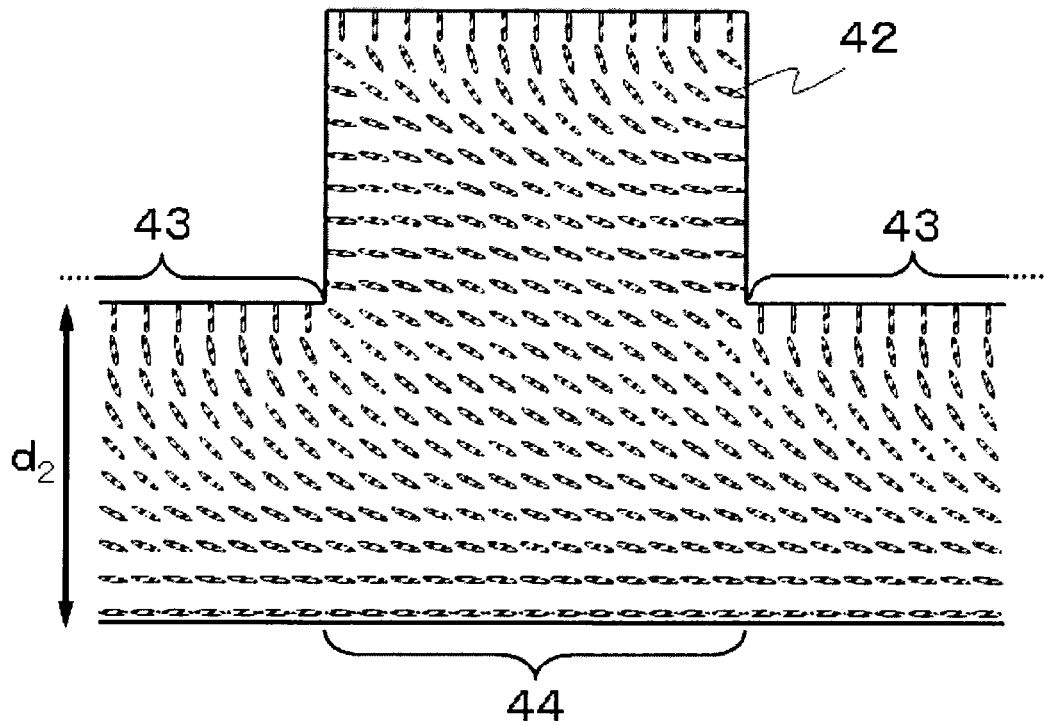

In FIG. 4A showing the liquid crystal element 40, a portion of the liquid crystal layer of the liquid crystal element 30a is diagrammatically illustrated. FIG. 4A is a sectional diagram illustrating the alignment state of the liquid crystal molecules 42 filled in the diffraction grating structure. In FIG. 4A, an alignment layer (not illustrated) is formed, the surface on the liquid crystal side (diffraction grating structure) of the transparent substrate 41a is vertically aligned, and the surface on the liquid crystal side of the transparent substrate 41b is horizontally aligned. Also, explanation will be made on the assumption that the diffraction grating structure is divided into two regions: a region 43 that is the concave portion and a region 44 that is the convex portion. They represent spaces of the liquid crystals having a width in the X direction of the region 43 of the concave portion and the region 44 of the convex portion. FIG. 4B is a diagram further microscopically illustrating the distribution of the alignment of the liquid crystal molecules in portions of the convex portion 44 and the concave portion 43 in FIG. 4A, which corresponds to the distribution that indicates the result of interpreting the liquid crystal molecules as a continuous medium.

In FIGS. 4A and 4B, since the diffraction grating side (i.e. the concavo-convex portion) of the liquid crystal layer is vertically aligned, the liquid crystal molecules are aligned approximately in the vertical direction with respect to the diffraction grating surface (i.e. the concavo-convex surface). That is, in FIGS. 4A and 4B, the liquid crystal molecules, which are in contact with the surface that is parallel to the X-axis direction of the diffraction grating surface, are aligned in a direction where their longitudinal direction is approximately in parallel to the Z-axis direction (i.e. approximately perpendicular to the X-axis direction), and the liquid crystal molecules, which are in contact with the surface that is parallel to the Z-axis direction, are aligned in a direction where their longitudinal direction is approximately in parallel to the X-axis direction (i.e. approximately perpendicular to the Z-axis direction). On the other hand, the side of the transparent substrate 41b is horizontally aligned, and the liquid crystal molecules, which are in contact with the surface of the transparent substrate 41b, are aligned so that their longitudinal direction is approximately in parallel to the X-axis direction. At this time, the approximate verticality may correspond to an angle of 0° to 15° with respect to the normal line of the contact surface, and the approximate horizontality may correspond to an angle of 0° to 15° with respect to the contact surface. Also, in order to arrange the alignment of the liquid crystal molecules in order, the alignment may have a regular pre-tilt angle, which is preferably in the range of 0.1° to 15°, and more preferably in the range of 1° to 15°.

Here, the alignment distribution of the liquid crystals (molecules) in the region of the concave unit 43 will be first described. The liquid crystals in a region (with a thickness of $d_2$) that is interposed between the vertically aligned transparent substrate 41a and the horizontally aligned transparent substrate 41b that is opposite to the transparent substrate 41a are distributed in a so called hybrid-aligned state in which the liquid crystals are spatially changed from the surface of the transparent substrate 41a toward the transparent substrate 41b, and from the vertical alignment for the surface of the transparent substrate 41a to the horizontal alignment for the surface of the transparent substrate 41b. In contrast, among the liquid crystals in the region of the convex portion 44, the liquid crystal molecules, which are in contact with the surface that is parallel to the X axis of the transparent substrate 41a, are vertically aligned, and the liquid crystal molecules, which are in contact with the surface (i.e. the side surface of the diffraction grating) that is parallel to the Z axis of the transparent substrate 41a, are approximately vertically aligned. Accordingly, in the neighborhood of the surface of the transparent substrate 41a which is in parallel to the X axis, the longitudinal of the liquid crystal molecules is aligned approximately in parallel to the X-axis direction. Also, the surface that is in contact with the transparent substrate 41b is aligned approximately in parallel to the X-axis direction in the same manner. In this case, the region with the thickness of $d_2$ of the convex portion 44 is influenced by the hybrid alignment of the neighboring concave portion and is tilt-aligned in the X direction.

Here, a diffraction device (not illustrated) is considered, in which the liquid crystal molecules in the liquid crystal layer are almost uniformly aligned in a direction in which the liquid crystal molecules have the refractive index for extraordinary light with respect to the polarization direction of the transmitted light and which is filled with an isotropic material having the refractive index $n_s$ that is approximately equal to the refractive index for ordinary light of the liquid crystals of the diffraction grating ($n_o = n_s$). In this case, the difference in length between the length of the path of the light that is transmitted through the concave portion and the length of the path of the light that is transmitted through the convex portion is extended in proportion to the depth d of the grating (corresponding to $d_1 - d_2$ as shown in FIG. 4A). Accordingly, in the case of constructing the liquid crystal layer that is arranged to fill the diffraction grating by using the same liquid crystal material, it is necessary to extend the depth d of the grating in order to extend the difference in length between the light paths.

In contrast, if the liquid crystal molecules are distributed in the liquid crystal layer as shown in FIGS. 4A and 4B, the difference between the length of the path of the light that is transmitted through the concave portion 43 and the length of the path of the light that is transmitted through the convex portion 44 (i.e. the difference in length between light paths) can be extended with respect to the light that is transmitted through the diffraction grating in parallel to the Z-axis direction, from the characteristic of the refractive index anisotropy. In particular, since the size of the difference in length between the light paths can be adjusted by adjusting the thickness $d_2$, it is not necessary to extend only the depth $d_1 - d_2$ of the diffraction grating of the liquid crystal element 40, and thus the processing of the diffraction grating can be facilitated. Hereinafter, this principle will be described.

For example, a material is considered, which has a positive characteristic of dielectric anisotropy $\Delta \in (= \in_{\parallel} - \in_{\perp})$ that is the difference between the dielectric constant $\in_{\parallel}$ in the longitudinal direction of the liquid crystal molecules and the dielectric constant $\in_{\perp}$ in the short-axis direction of the liquid crystal molecules. Also, the relation between the refractive index $n_e$ for extraordinary light and the refractive index $n_o$ for ordinary light in the liquid crystals having the refractive index anisotropy with respect to the light of a wavelength $\lambda$ is $n_e > n_o$, and the light in the polarization state that is in parallel to the longitudinal direction of the liquid crystal element 40 realizes the refractive index for extraordinary light. If linear polarized light, which travels in a direction that is parallel to Z axis and oscillates in the X direction, is incident to the liquid crystal element 40, it travels with the refractive index for extraordinary light with respect to the liquid crystals which are aligned in X-axis direction, and travels with the refractive index for ordinary light with respect to the liquid crystals which are aligned in Z-axis direction. Also, the refractive index $n_s$ of the transparent substrate 41a coincides with the refractive index $n_o$ for ordinary light. In this case, if it is assumed that the thickness of the liquid crystal layer in which the light travels with the refractive index for ordinary light is $d_o$ and the thickness of the liquid crystal layer in which the light travels with the refractive index for extraordinary light is $d_e$, the length L of the path of the light that is transmitted through the liquid crystal layer can be expressed by $$L = n_e \cdot d_o + n_o \cdot d_e \quad (2)$$

Here, the optical characteristic of the liquid crystal element 40 according to the first embodiment on the assumption that the relation between the refractive indices is $n_o = n_s$ in the same manner. It is assumed that the thickness of the convex portion 44 corresponding to the refractive index for extraordinary light and the thickness of the convex portion 44 corresponding to the refractive index for ordinary light are $d_{e1}$ and $d_{o1}$, respectively, and the thickness of the concave portion 43 corresponding to the refractive index for extraordinary light and the thickness of the concave portion 43 corresponding to the refractive index for ordinary light are $d_{e2}$ and $d_{o2}$, respectively. In the liquid crystal device 40 in which the diffraction grating surface is vertically aligned, when the light travels in a direction that is parallel to Z axis and linear polarized light in the X direction is incident, the light greatly realizes the refractive index $n_e$ for extraordinary light rather than the refractive index $n_o$ for ordinary light with respect to the thickness $d_1$ of the convex portion ($d_{e1} > d_{o1} \neq 0$), and thus the average length $L_1$ of the light path of the convex portion 44 has the relation of $(n_e + n_o) \cdot d_1 / 2 < L_1 < n_e \cdot d_1$.

On the other hand, since the liquid crystal of the concave unit 43 is in a hybrid alignment state, the length $L_2$ of the light path of the concave portion 43 becomes $L_2 \cong (n_e + n_o) \cdot d_2 / 2$. Also, the length $L_2'$ of the light path, which has a thickness $d_1$, of the light that is transmitted through the concave portion 43 and a portion of the transparent substrate 41a (which has a thickness of $d_1 - d_2$) becomes $L_2' = L_2 + n_o \cdot (d_1 - d_2)$ since the relation between the refractive indices is $n_s = n_o$.

As described above, the difference in length between the light paths $\Delta L (= L_1 - L_2')$ can be adjusted by the thickness $d_1$ and the thickness $d_2$ with respect to a specified liquid crystal material. For example, when the liquid crystal element that provides the specified difference in length (phase difference) $\Delta L$ between the light paths is realized, a difference in length occurs between the length of the light path in the region of the concave portion 43 having a thickness of $d_2$ and the length of the light path in the region of the convex portion 44 having the thickness $d_2$, and thus it is not necessary to extend the difference in length between light paths of the concave portion 43 and the convex portion 44, which occurs at the grating depth of $d (= d_1 - d_2)$. Accordingly, since the grating depth d can be shortened, it is not necessary to extend the grating depth $(d_1 - d_2)$ in order to obtain a desired difference in length between light paths, and thus the processing of the diffraction grating can be facilitated. Also, since the diffraction efficiency can be controlled by changing the thickness $d_2$ rather than the grating depth d in order to obtain desired diffraction efficiency, the improvement of the productivity can be expected in processing the diffraction grating structure.

Figure 5:
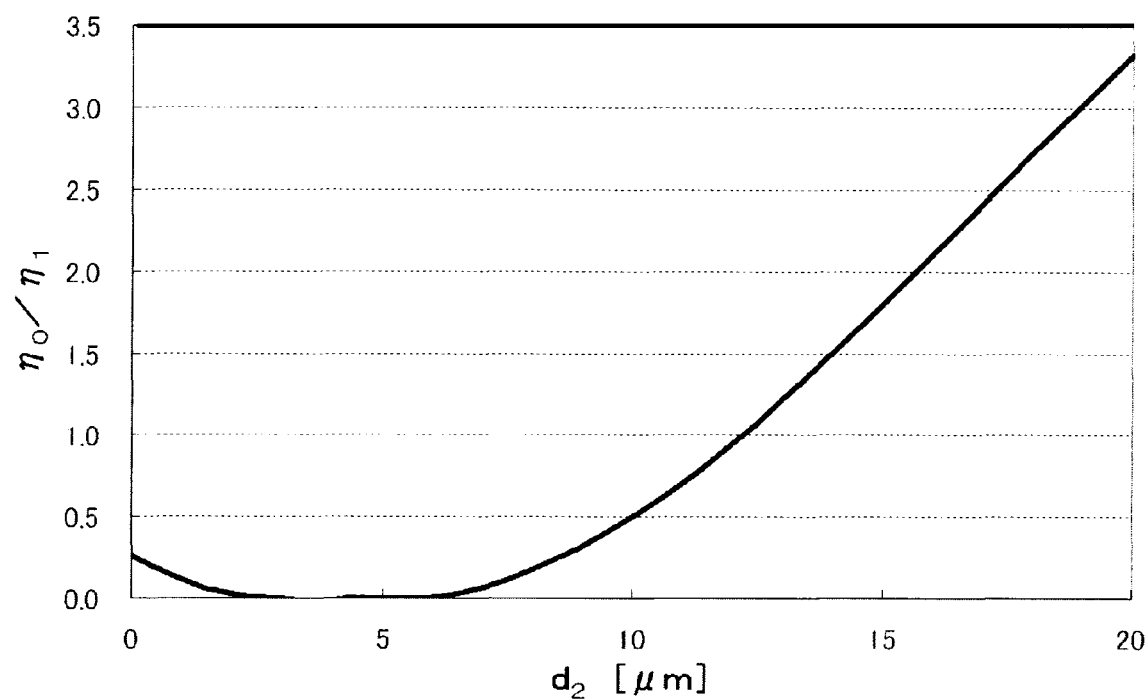
FIG. 5 is a graph illustrating a characteristic example of a diffraction efficiency rate ($\eta_0/\eta_1$) with respect to the thickness $d_2$ of a liquid crystal element 40.

FIG. 5 shows the result obtained by simulation with respect to the change of the diffraction efficiency rate $(\eta_0 / \eta_1)$ that indicates the ratio of the 1-order diffraction efficiency $\eta_1$ to the 0-order diffraction efficiency (i.e. direct transmittance) $\eta_0$ when the thickness $d_2$ of the liquid crystal element 40 is changed in a state where the grating depth d has a constant value. In this case, it is assumed that the incident light is a linear polarized light in the X direction which has a wavelength of 405 nm and travels in the Z direction, the refractive index anisotropy $\Delta n$ of the liquid crystals is 0.17, and the transparent substrates 41a and 41b coincide with the refractive index $n_o$ for ordinary light of the liquid crystals. In this case, it is assumed that the grating pitch is 2 μm, the duty, which is a ratio of the width of the convex portion of the grating pitch to the width of the concave portion thereof, is 1:1, and the grating depth d is 1.27 μm. According to the result as illustrated in FIG. 5, in the case where the thickness $d_2$ is about 2 to 6 μm, the 0-order diffraction efficiency $\eta_0$ is almost 0, but in other thicknesses, the 0-order diffraction light (directly transmitted light) having a constant value is generated, and thus there is a correlation between the value of the thickness $d_2$ and the diffraction efficiency rate $(\eta_0 / \eta_1)$. As described above, since the optical characteristic of the liquid crystal element 40 can be adjusted without changing the grating depth d, it is possible to make an optical design having a high degree of freedom without changing the diffraction grating structure.

Although the grating pitch of the liquid crystal element 40 follows even the wavelength $\lambda$ of the incident light in Equation (1) as described above and the detailed set value of the diffraction angle $\theta$ of the light that is transmitted through diffraction of the incident light, it is necessary to narrow (or shorten) the grating pitch P in order to extend a desired diffraction angle $\theta$. In an embodiment of the present invention, the liquid crystal element 40 has a suitable structure in this case. There is no special limit in the length of the grating pitch P, and the liquid crystal element 40 according to an embodiment of the present invention can be used in this case. In particular, the liquid crystals can be satisfactorily aligned with respect to the diffraction grating surface having the grating pitch that is equal to or less than P=20 μm, for which the alignment control by rubbing is difficult, but which can extend the diffraction angle $\theta$, and desired optical characteristics can be obtained without extending the grating depth d even if the grating pitch P is shortened.

Also, the liquid crystal element 40 according to an embodiment of the present invention can be adopted by making the minimum value of the grating pitch smaller as far as the processing accuracy permits, and even in the case where the grating pitch becomes smaller than the wavelength, the liquid crystal element 40 according to an embodiment of the present invention can be adopted as a wavelength plate which has the refractive index anisotropy and structural birefringence of the liquid crystals and the dispersion characteristic of the refractive index anisotropy that is superior to the typical characteristic. Although a diffraction grating having a tetragonal cross section has been described up to now, the shape of the diffraction grating is not limited thereto, and the diffraction grating may have a blazed-type or multi-step type cross section. In this case, if the grating pitch P is 1 to 20 µm, the diffraction grating is effective in processing easiness and optical characteristic.

In this case, it is enough that the value $d_2$ is equal to or larger than 0. However, since in order to obtain a large difference in length ΔL between light paths, a large diffraction grating depth $(d_1-d_2)$ is necessary, it is preferable that the value $d_2$ is larger than 0 in order to facilitate the processing of the grating groove. Also, by extending the value $d_2$, the length of the light path of the convex portion 44 can be extended with respect to the concave portion 43 of the liquid crystal layer having the thickness of $d_2$ as shown in the alignment diagram of the liquid crystal molecules 42 inside the liquid crystal layer of FIGS. 4A and 4B. However, if the thickness $d_2$ is further extended, the liquid crystal molecules in the portion having the thickness of $d_2$ of the convex portion 44 are liable to be influenced by the hybrid alignment of the neighboring concave portion. Due to this, the difference in length between the light paths of the convex portion 44 and the concave portion 43 in the portion having the thickness of $d_2$ becomes smaller. Accordingly, it is preferable that the thickness of $d_2$ is equal to or less than 10 times the grating depth of $(d_1-d_2)$, and it is more preferable that the thickness of $d_2$ is equal to or less than 5 times the grating depth of $(d_1-d_2)$.

Also, if linear polarized light, which travels in a direction that is parallel to Z axis and oscillates in the Y direction, is incident to the liquid crystal element 40, it travels with the refractive index for ordinary light in both the convex portion 44 and the concave portion 43. In this case, if the refractive index of the transparent substrate 41a is made to coincide with the refractive index $n_o$ for ordinary light, the incident light is not diffracted, but is directly transmitted through the substrate to realize the liquid crystal element having the polarization dependence. Although liquid crystals using a material which has a positive dielectric anisotropy have been described, a material which has a negative dielectric anisotropy may be used. Also, the length direction of the diffraction grating is not limited to 1 direction of the Y direction such as in the liquid crystal element 30a, and may include 2 or more directions in the light-incident region to selectively diffract the light.

Next, a method of manufacturing a diffraction grating will be described. As a method of forming the cross section of the diffraction grating, for example, in a tetragonal shape, processing by photolithography and etching, imprinting, cutting, or the like, is possible. Also, by alignment processing, e.g. by a vertical alignment processing method, the alignment layer can be formed by polyimide spreading, $SiO_2$ particulate layer, orthorhombic deposition, and silane coupling treatment by silane having alkyl group, perfluoro group, and the like, or combination thereof.

There are a horizontal alignment method that corresponds to a horizontal direction against a level (transparent) substrate surface and a vertical alignment method that corresponds to a vertical direction against the level (transparent) substrate surface. The horizontal alignment method may be a method of forming a polyimide layer on a transparent substrate and rubbing the surface thereof, an orthorhombic deposition method, a photo alignment method, an ion beam alignment method, alignment by a groove structure, or a combination thereof, to form an alignment layer. On the other hand, as the vertical alignment method, the same method as the alignment processing of a grating surface as described above can be used.

Figure 6A:
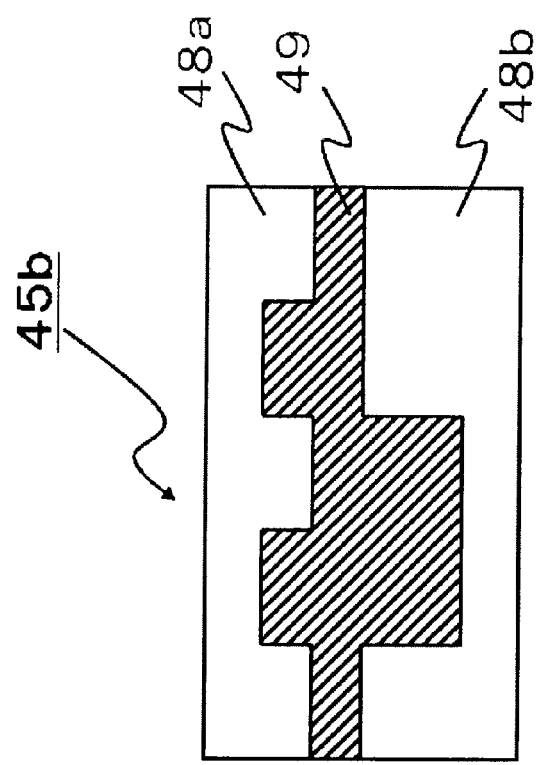
FIGS. 6A and 6B are sectional diagrams illustrating another constituent example of a liquid crystal element according to a first embodiment.
Figure 6B:
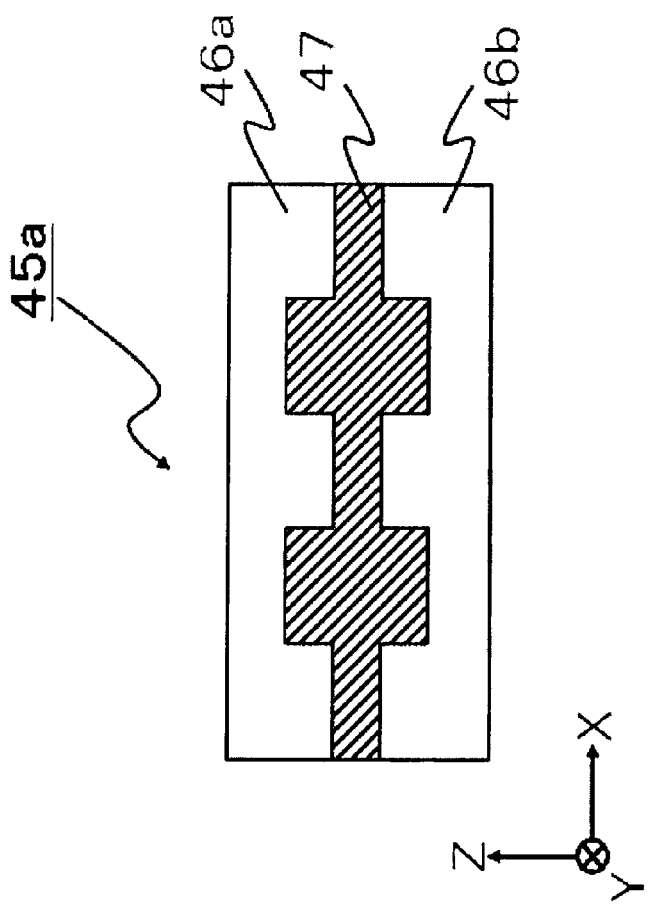

Although the liquid crystal element 30a in which the diffraction grating structure is installed only on the transparent substrate 31a has been described, the installation of the diffraction grating structure is not limited thereto. For example, the diffraction grating is also formed on the side of the liquid crystal layer 32 of the transparent substrate 32b, and both sides of the liquid crystal layer 32 are inserted into the diffraction grating structure. FIGS. 6A and 6B are sectional diagrams illustrating liquid crystal elements 45a and 45b having diffraction grating structures on respective surfaces of two transparent substrates which are opposite to each other. In the liquid crystal element 45a of FIG. 6A, the same grating pitches are provided on the sides of the transparent substrates 46a and 46b, respectively, a liquid crystal layer 47 is interposed between the transparent substrates, and respective groove portions are arranged neatly. In this case, since the difference between the length of the path of the light that is transmitted through the concave portion and the length of the path of the light that is transmitted through the convex portion becomes greater, the aspect ratio of a diffraction grating on one side becomes smaller in comparison to the case where a desired difference in length between the light paths is obtained only by a diffraction grating on one side. Also, in the case of arranging gratings having the same pitch on both sides of the liquid crystal layer 47 as diffraction gratings, it is preferable that a gap between concave portions is equal to or less than 20 µm, and it is more preferable that the gap is equal to or less than 10 µm.

Also, in the case of arranging diffraction gratings having different grating pitches on both sides of the liquid crystal layer 47 and using the gratings as diffraction gratings, they have the effect of improving the extinction ratio of the directly transmitted light with respect to the incident light. In this case, it is preferable that the gap between the concave portions of the liquid crystal layer is generally equal to or larger than 10 µm, and it is more preferable that the gap is equal to or larger than 20 µm. Also, in the liquid crystal element 45b of FIG. 6B, the grating pitch on the side of the transparent substrate 48b is integer times, here, twice, the grating pitch on the side of the transparent substrate 48a, and a portion, which is interposed between the liquid crystal layer 49 and forms an edge of the groove on the side of the transparent substrate 48b, is arranged neatly at the edge of the groove on the side of the transparent substrate 48a. In this case, since the thickness of the liquid crystal layer 49 in the X-axis direction is changed in four steps, the length of the path of the light that is transmitted through the liquid crystal layer 49 in the Z direction is indicated in steps, and its cross section may analogously serve as a step type diffraction grating. In addition, in the case where it is intended to improve the extinction ratio of the directly transmitted light with respect to the incident light by using the liquid crystal elements 45a and 45b, it is preferable that a gap between the concave portions is equal to or less than 20 µm, and it is more preferable that the gap is equal to or less than 10 µm.

Second Embodiment

Figure 7A:
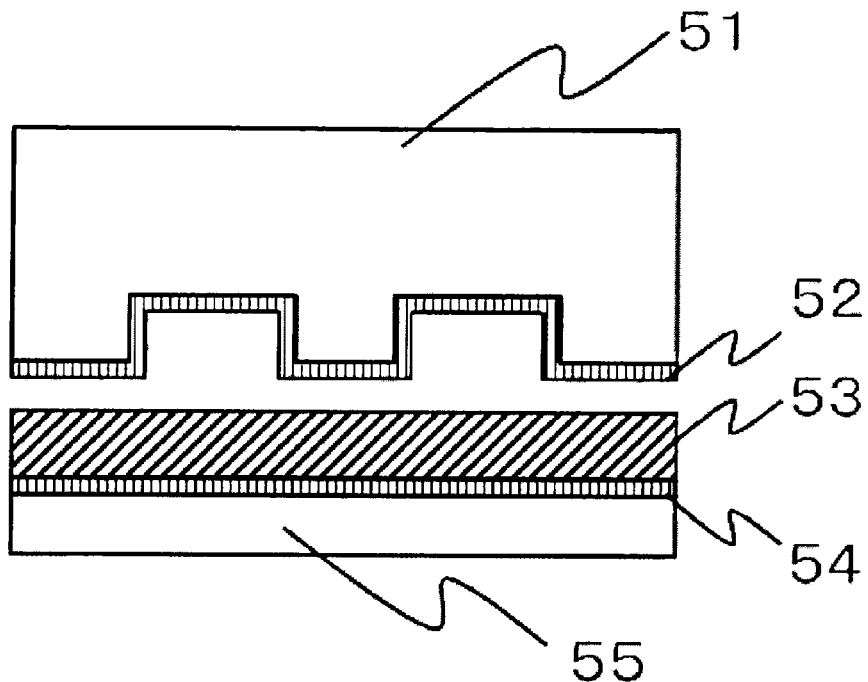
FIGS. 7A to 7C are diagrams illustrating processes of a liquid crystal element according to a second embodiment.
Figure 7B:
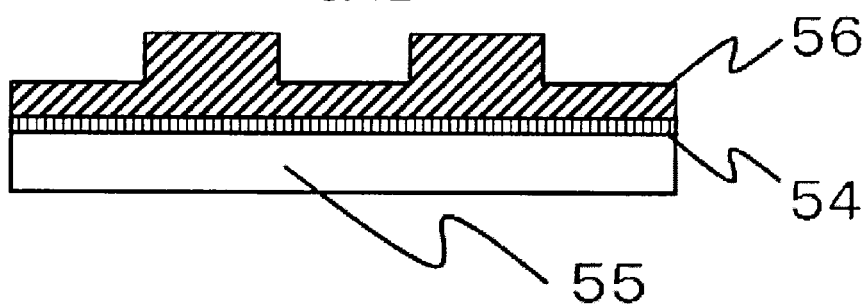
Figure 7C:
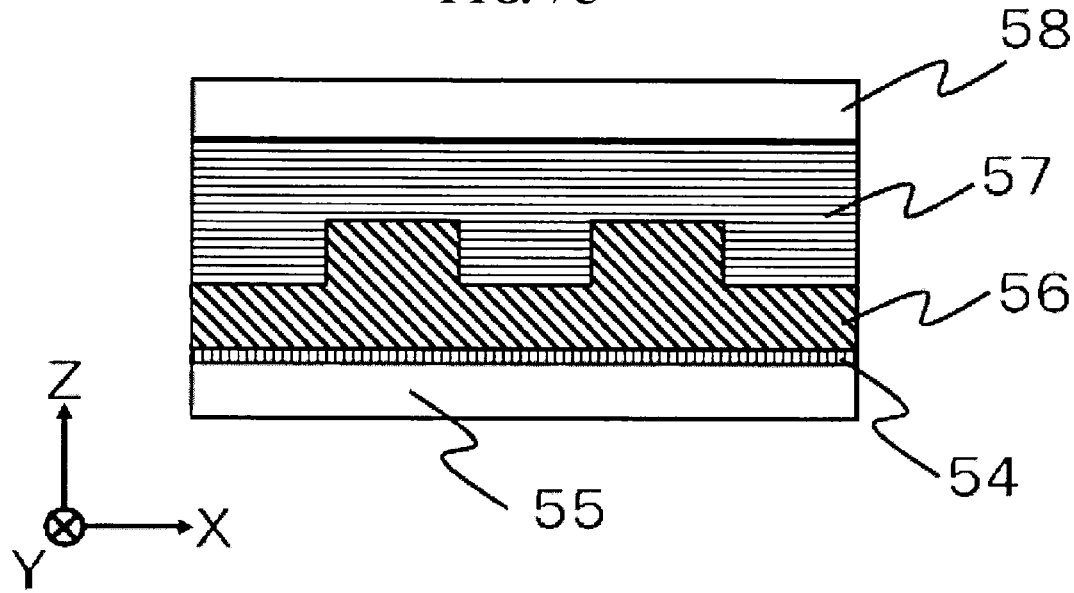

In the second embodiment, the liquid crystal element has the same structure as the liquid crystal element 30a in the first embodiment, but polymer liquid crystal material is used in the liquid crystal layer 32. In this case, in order to determine the alignment state of the polymer liquid crystals, an alignment layer that is vertically aligned is installed on the diffraction grating surface (i.e. the surface that is in contact with the transparent substrate 41a of FIG. 4A), and an alignment layer that is horizontally aligned is installed on the transparent substrate surface (i.e. the surface that is in contact with the transparent substrate 41b of FIG. 4A). FIGS. 7A to 7C are diagrams illustrating processes of a light imprint method which is one of methods for curing the liquid crystals while maintaining the alignment state that is represented as the first embodiment. Hereinafter, the method will be described in detail.

An alignment layer 54 formed on a transparent substrate 55 in FIG. 7a is horizontally aligned to be in parallel to the X direction, and a polymerizable liquid crystal layer 53 is formed on the alignment layer 54. The polymerizable liquid crystal layer 53 is made of acrylic polymerizable liquid crystals having mesogen unit or the like. In a mold substrate 51, a surface that forms a frame mold has a diffraction grating shape, and a vertically aligned material layer 52 composed of a vertically aligned material is installed on the diffraction grating surface. It is preferable that the mold substrate is made of an inorganic material, such as quartz, silicon, or the like, in consideration of the durability. The vertically aligned material layer 52 can vertically align the liquid crystals and perform release coating after polymerizing the polymerizable liquid crystal layer 53. The vertically aligned material layer 52 may be made of, for example, silane having perfluoro group.

A grating shape is formed by pressing the mold substrate 51 having the vertically aligned material layer 52 illustrated in FIG. 7A onto the polymerizable liquid crystal layer 53, and the polymerizable liquid crystals are polymerized by making ultraviolet rays reach the grating shape as maintaining the state. If the mold substrate 51 is released from the liquid crystals (liquid crystal polymers) after polymerization, a liquid crystal polymer layer 56 on which the grating shape is formed is produced as shown in FIG. 7B. In this case, the liquid crystals of the liquid crystal polymer layer 56 show the distribution so that they are aligned as shown in the liquid crystal element 40 in the first embodiment, and in the same manner, the optical characteristic can be controlled by changing the value of the thickness $d_2$.

A parallel transparent substrate 58 is arranged opposite to the substrate that includes the liquid crystal polymer of the grating structure of FIG. 7B, and isotropic transparent monomer is filled between the two substrates as a filler to form an isotropic transparent polymer layer 57. In this case, it is preferable that the refractive index of the transparent polymer layer 57 is approximately equal to either of the refractive index for ordinary light of polymer liquid crystals or the refractive index for extraordinary light. Also, the filler is not limited to the isotropic material, and may be a birefringence material or a transparent polymerizable material.

It is also possible to construct the liquid crystal element that does not use the isotropic transparent polymer layer 57. In this case, for example, by making the grating pitch of the diffraction grating (i.e. the concavo-convex portion) of the liquid crystal layer 56 shorter than the wavelength λ of the incident light, it is efficient to use the liquid crystal element as a form birefringence device. In this case, the control of the wavelength dispersion of the refractive index can be improved in comparison to the case in which the diffraction grating structure is formed of an isotropic material.

For example, in the case of forming the diffraction grating structure with the isotropic material, the control of the wavelength dispersion of the refractive index becomes insufficient since in order to improve the birefringence, the filling material is not used in the diffraction grating structure, but the difference in refractive index that occurs between air and a material that forms the diffraction grating is used. In this case, however, since the liquid crystals themselves holds the birefringence and can increase parameters when the form birefringence is formed, the control of the wavelength dispersion or the form birefringence can be improved in comparison to the isotropic material even in the case of using the difference between air and the refractive index, and it is easy to represent the wavelength selectivity or wideband property to possess great advantage. Also, the diffraction grating structure may be used as a structure that has the anti-reflection effect with respect to the incident light. In this case, since the liquid crystals have birefringence, the refractive indices of both the polarization on the abnormal dispersion side and the polarization on the normal dispersion side are not discontinuously changed, but can be continuously changed, and thus it is possible to use the diffraction grating structure as a structure having anti-reflection effect with very small polarization dependence with respect to the isotropic medium such as the air interface.

Third Embodiment

Figure 8B:
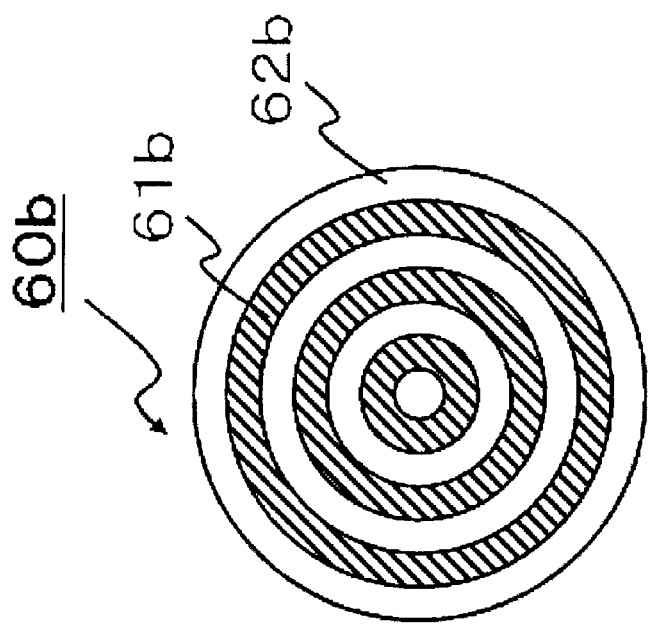
FIGS. 8A and 8B are plan diagrams of a liquid crystal element according to a third embodiment.
Figure 8A:
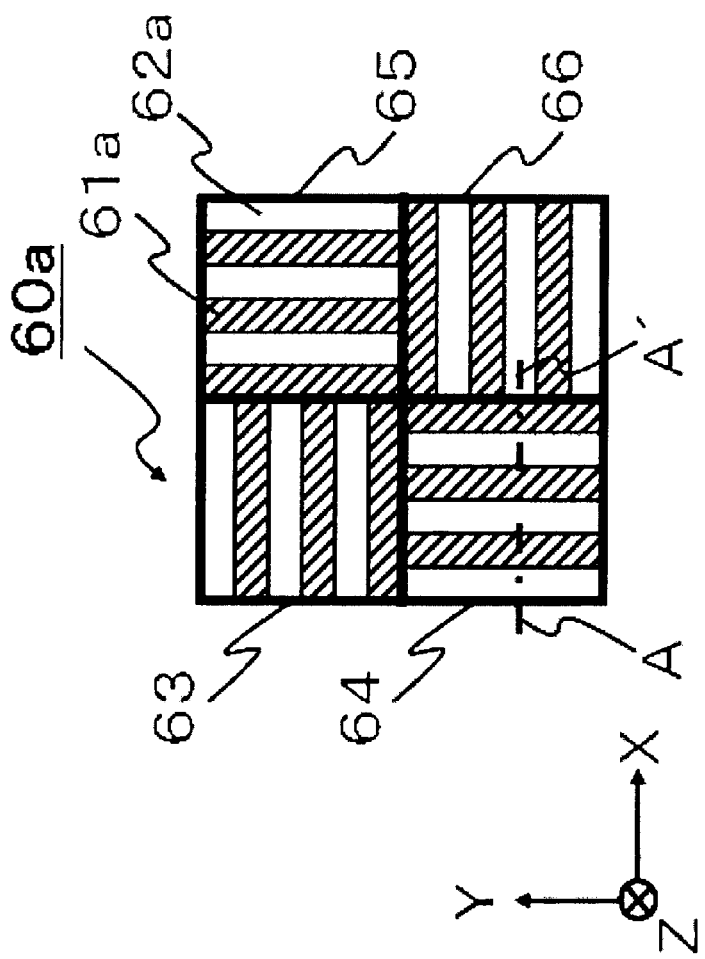

As the third embodiment, liquid crystal elements having a non-uniform grating direction that is the period direction of the concavo-convex of the surface having the diffraction grating are shown in FIGS. 8A and 8B. As an example of a liquid crystal element, such as the liquid crystal element 60a of FIG. 8A in an X-Y plane, the grating directions of neighboring regions 63, 64, 65, and 66 may be patterned to differ from one another, or as the liquid crystal element 60b of FIG. 8B, the diffraction grating direction may be patterned to be radially continuous in a radius direction from the center of a circle. The region is not limited to a tetragon, and may have an arbitrary shape, and the continuous pattern may also be changed optionally. Also, 61a and 61b denote concave portions of the diffraction gratings and 62a and 62b denote convex portions thereof.

Also, in FIGS. 8A and 8B, in the case where the alignment process of the liquid crystals on the opposite transparent substrate side (not illustrated) is the horizontal alignment with respect to the transparent substrate, the grating direction is changed in parallel to the length direction of the diffraction grating. As a method for patterning of the horizontal alignment processing, there are patterning by alignment by the groove structure and patterning of alignment using a masking method. On the other hand, in the case of vertical alignment, the above-described patterning is unnecessary, and the overlapping accuracy or the like is also unnecessary. Hereinafter, according to the third embodiment, explanation will be made on the assumption that the liquid crystals on the opposite level transparent substrate side (not illustrated) are vertically aligned.

Figure 9A:
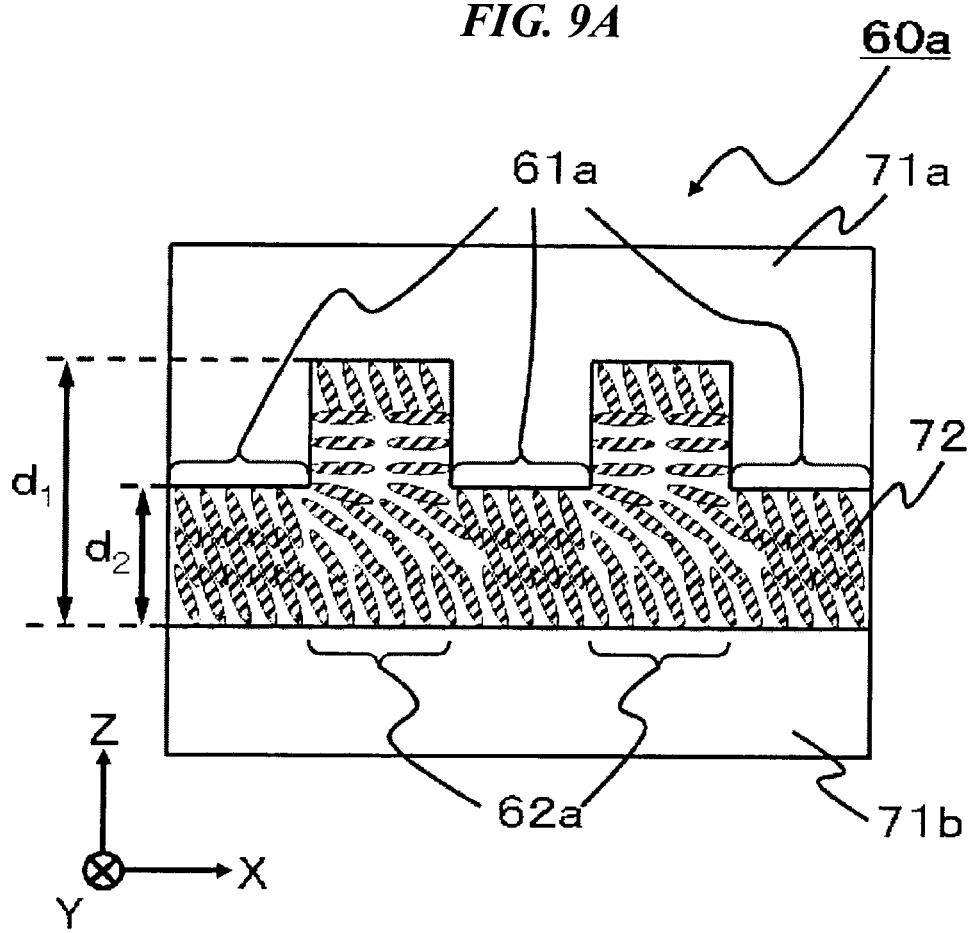
FIGS. 9A and 9B are cross sectional diagrams illustrating an alignment state in a liquid crystal layer of a liquid crystal element according to a third embodiment.

FIG. 9A is a partial sectional diagram taken along line A-A' of a liquid crystal element 60a. The liquid crystals are interposed between transparent substrates in the same manner as in the first and second embodiments. In the liquid crystal element 60a, the alignment direction of (a long axis of) the liquid crystal molecules, which are in contact with a flat transparent substrate 71b, is the Z-axis direction that is approximately vertical direction against the surface of the transparent substrate 71b, and the alignment direction of the liquid crystal molecules, which are in contact with the transparent substrate 71a having the diffraction grating is approximately the vertical direction against the respective surfaces. Since portion 71a (having a thickness of $d_2$), which are concave portions, are vertically aligned with each other, the alignment direction of the liquid crystal layer is approximately in vertical state.

Figure 9B:
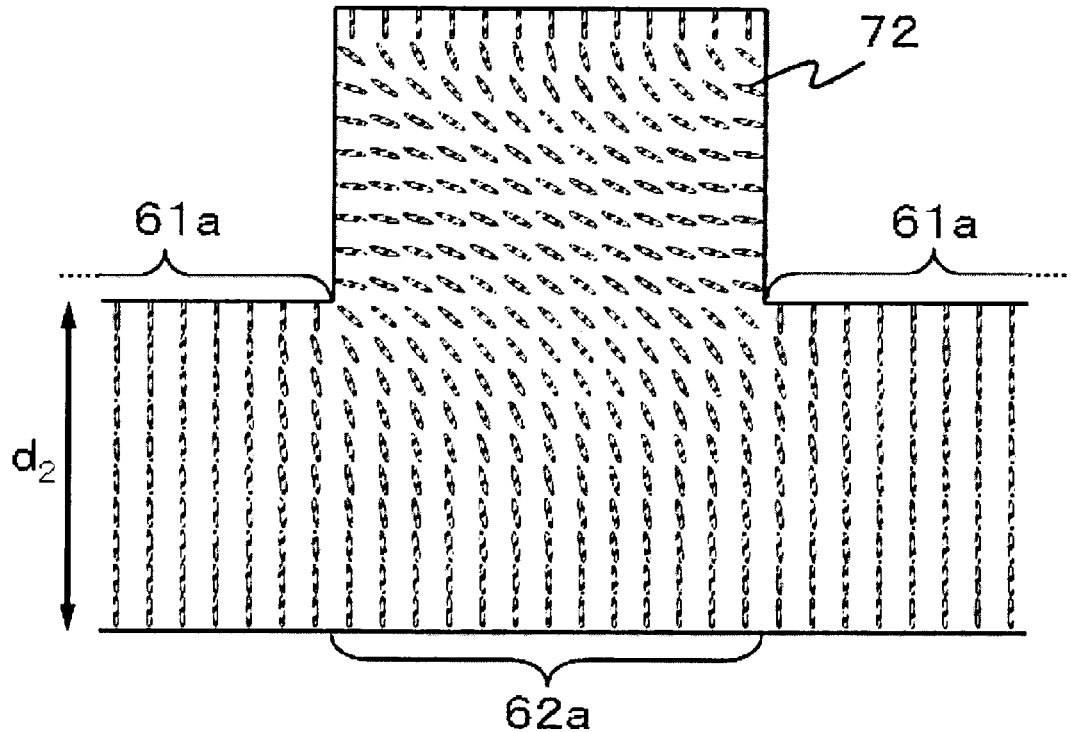

On the other hand, in the convex portion 62a (with a thickness of $d_1$), since the liquid crystals that are in contact with the transparent substrate 71a are vertically aligned with respect to the surface of the transparent substrate 71a, and are also vertically aligned with respect to the diffraction grating wall surface (i.e. the surface that is in parallel to Z axis) of the diffraction grating as shown in FIG. 9A, the liquid crystal molecules are aligned in parallel to the X direction. Also, in the convex portion 62a, since the liquid crystals that are in contact with the transparent substrate 71b are also vertically aligned with respect to the transparent substrate 71b as described above, the convex portion 62a is aligned to have the distribution that the tilt angle is changed in the thickness direction toward the opposite diffraction grating. That is, in the convex portion 62a, the longitudinal direction of the liquid crystal molecules is hybrid-aligned with the distribution that is approximately in parallel to directions from the surface of the transparent substrate 71b to the transparent substrate 71a, from the Z direction to the X direction, and from the X direction to the Z direction, respectively. FIG. 9B is a diagram further microscopically illustrating the distribution of the alignment of the liquid crystal molecules in portions of the convex portion 62a and the concave portion 61a in FIG. 9A, which corresponds to the distribution that indicates the result of interpreting the liquid crystal molecules as a continuous medium.

In the case where the liquid crystal molecules on the side of the transparent substrate 71b of the liquid crystal layer are aligned approximately in the vertical direction as shown in FIGS. 9A and 9B, the optical characteristic can be controlled by changing the thickness $d_2$, without changing the grating depth d as in the liquid crystal element 40 in the first embodiment.

Figure 10:
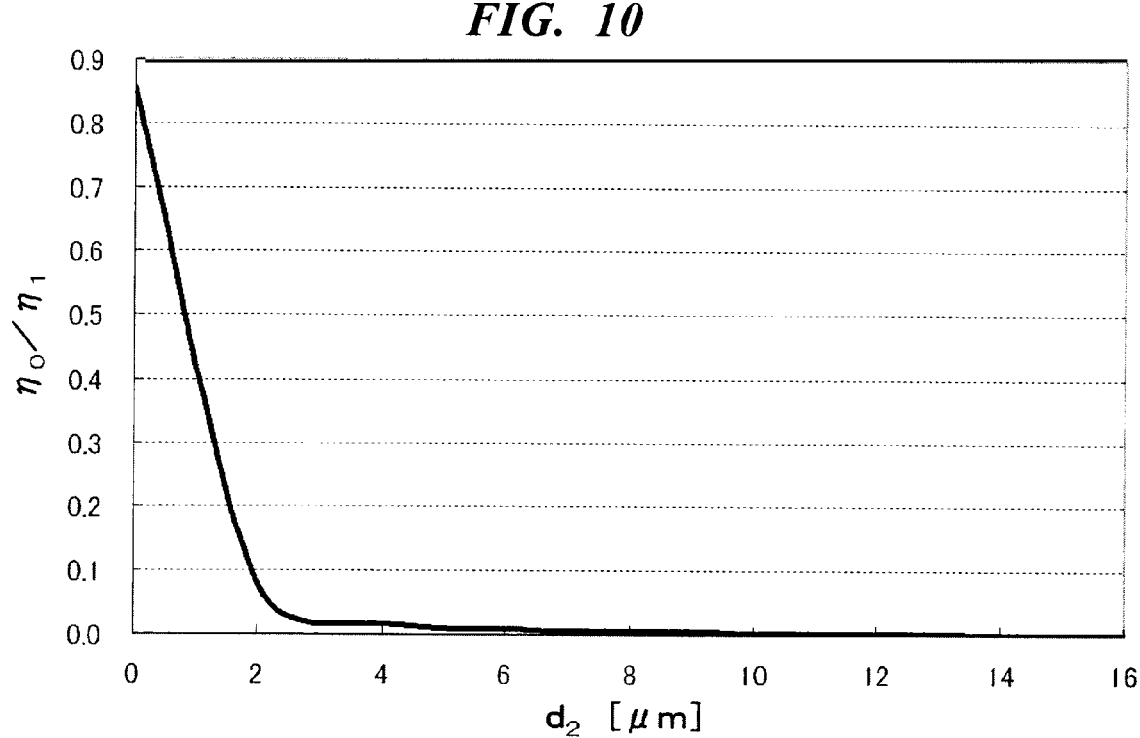
FIG. 10 is a graph illustrating a characteristic example of a diffraction efficiency rate ($\eta_0/\eta_1$) with respect to the thickness $d_2$ in a region 64 of a liquid crystal element 60.

FIG. 10 shows the result obtained by simulation with respect to the change of the diffraction efficiency rate ($\eta_0/\eta_1$) that indicates the ratio of the 1-order diffraction efficiency $\eta_1$ to the 0-order diffraction efficiency (i.e. direct transmittance) $\eta_0$ when the thickness $d_2$ is changed with respect to the region 64 of the liquid crystal element 60a in a state where the grating depth d has a constant value. In this case, it is assumed that the incident light is a linear polarized light in the X direction which has a wavelength of 405 nm and travels in the Z direction, the refractive index anisotropy Δn of the liquid crystals is 0.17, and the transparent substrates 71a and 71b coincide with the refractive index $n_o$ for ordinary light of the liquid crystals. In this case, it is assumed that the grating pitch of the diffraction grating is 2 μm, the duty that is a ratio of the width of the convex portion of the grating pitch to the width of the concave portion thereof is 1:1, and the grating depth d is 1.5 μm. According to the result as illustrated in FIG. 10, in the case where the thickness $d_2$ is equal to or larger than 7 μm, the 0-order diffraction efficiency $\eta_0$ is almost 0, but if the thickness $d_2$ becomes smaller than about 6 μm, the 0-order diffraction light (directly transmitted light) having a constant value is generated, and thus there is a correlation between the value of the thickness $d_2$ and the diffraction efficiency rate ($\eta_0/\eta_1$). As described above, even in the case where the liquid crystal molecules on the side of the transparent substrate 71b are aligned approximately in the vertical direction, the optical characteristic can be adjusted without changing the grating depth d, and thus it is possible to make an optical design having a high degree of freedom without changing the processing accuracy of the diffraction grating structure.

As described above, in the region 64 of the liquid crystal element 60a, the diffraction efficiency rate can be adjusted with respect to the linear polarized incident light in the X direction, and since the linear polarization in the Y direction the refractive index $n_o$ for ordinary light is obtained with respect to the linear polarization in the Y direction, the light is not diffracted, and almost 100% 0-order diffraction efficiency is obtained. Accordingly, the optical characteristic such as diffraction efficiency rate can be controlled according to the polarization state. As described above, for example, in the region 64 of FIG. 8A, the liquid crystal molecules in a portion of the convex portion 62a are aligned in the X direction, while in the region 63, the liquid crystal molecules in the portion of the same convex portion 62a is aligned in the Y direction. Also, in the region of FIG. 8B, the liquid crystal molecules are aligned in a radius (or radial) direction rather than in the center of the circle region. If the light that travels in the Z direction is incident in a state where the diffraction grating directions are different from each other in an X-Y plane, the light of the component in the polarization direction, which mates the tilt direction of the liquid crystal molecules of the respective convex portion, is transmitted.

The liquid crystal element, which can make the polarization state of the transmitted light for each region differ, is arranged, for example, in a light path between the liquid crystal element 10 and an optical detector 26 in an optical head device of FIG. 1 that reads a multi-layer optical disk having two or more information recording layers, and it is expected that the liquid crystal element has an effect to suppress the interference which is caused by the light reflected from the information recording layer and other layers (hereinafter referred to as "stray light"). Also, the light that is reflected from the information recording layer to be read becomes a signal light. In this case, if the liquid crystal element is arranged so that the signal light travels in the Z direction with respect to the liquid crystal element 60a and is directly polarized at 45° with respect to the X and Y directions, the light is transmitted through a cylindrical lens (not illustrated) in different polarization directions for respective regions, and is condensed on the optical detector. On the other hand, since the stray light is not condensed on the optical detector, the signal light may reach the optical detector through polarization in the X direction, and the stray light may reach one region of the optical detector through polarization in the Y direction.

Fourth Embodiment

Figure 2:
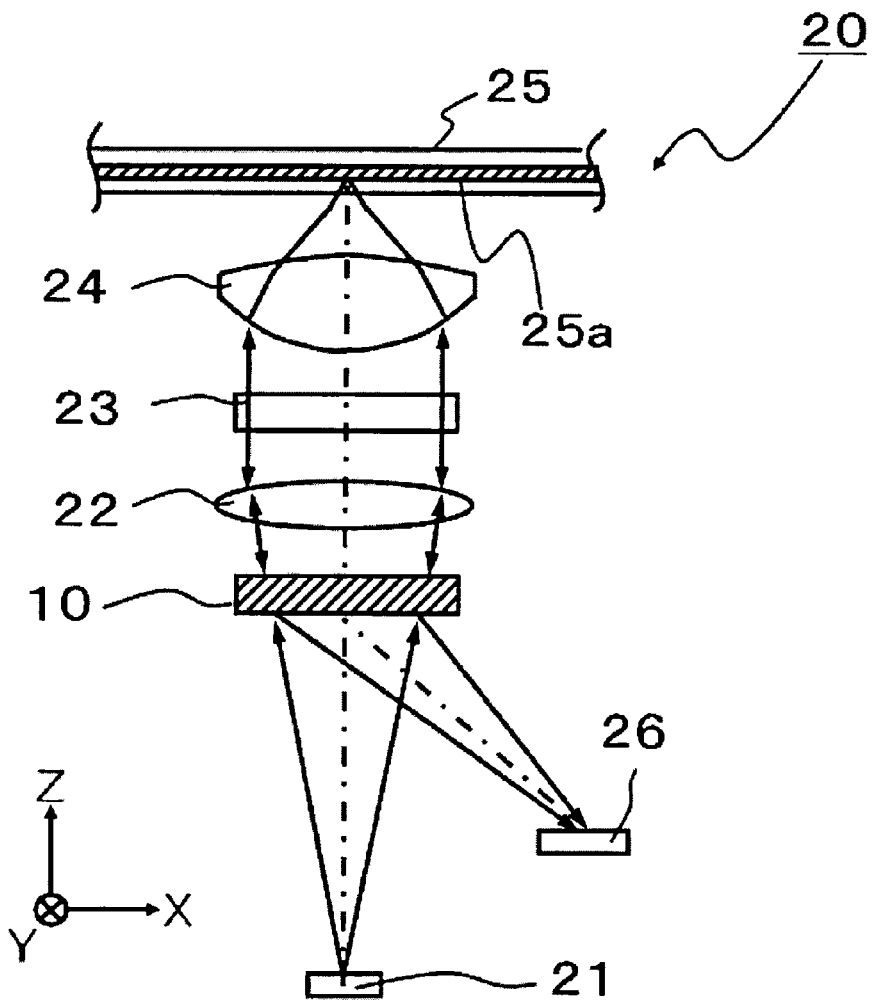
FIG. 2 illustrates an optical head device in which a liquid crystal element having polarization dependence is arranged.
Figure 11:
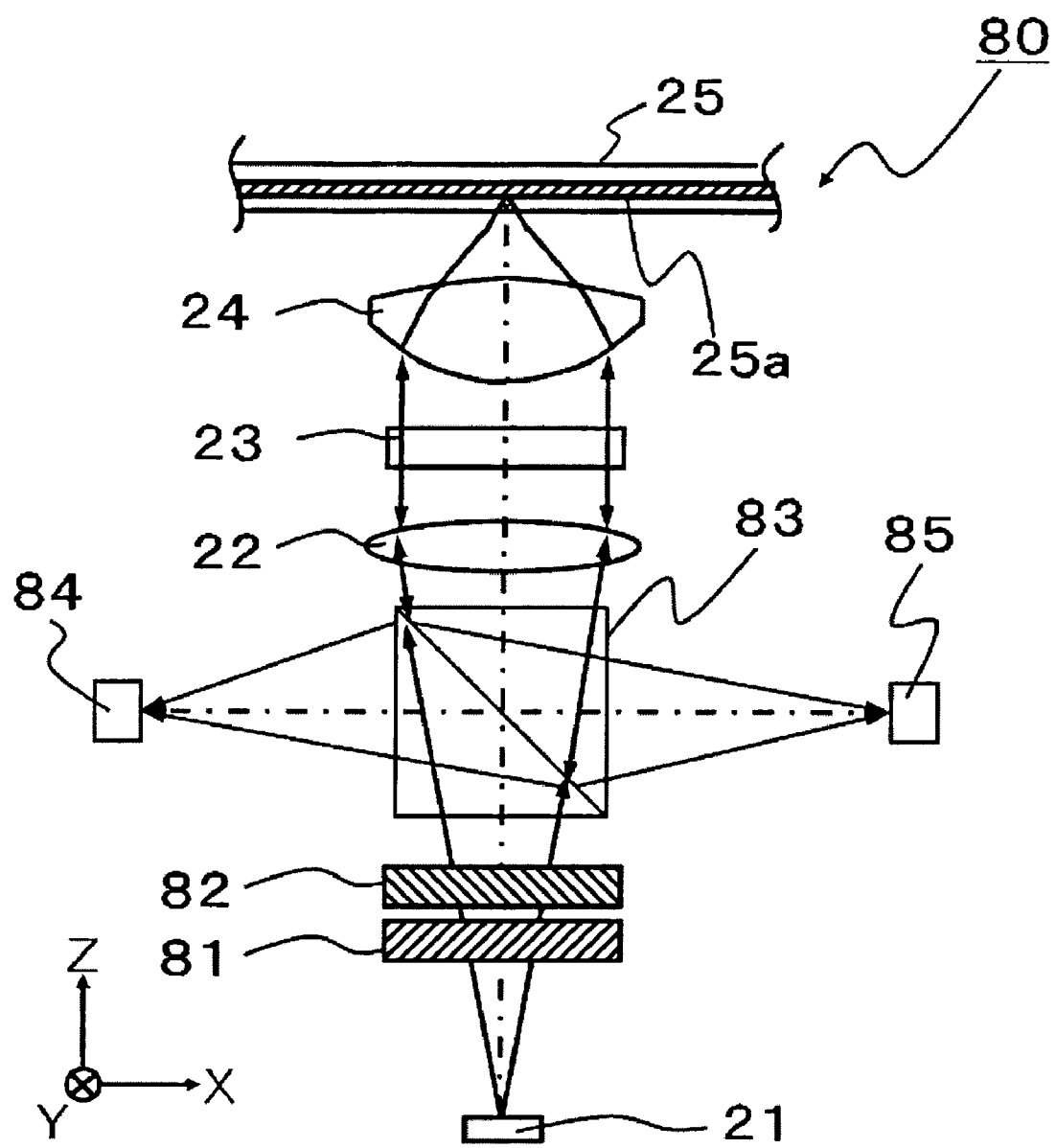
FIG. 11 illustrates an optical head device in which a liquid crystal element having polarization dependence is arranged as a polarization filter.

An optical head device using the liquid crystal element manufactured in the first embodiment or the second embodiment is illustrated in FIG. 11 as an example in the fourth embodiment. In this case, the optical head device 80 is composed of optical components common to the optical head device 20 of FIG. 2. The same reference numerals are given to the same portions, and the duplicate description thereof will be omitted. The light is emitted from a semiconductor laser 21 that is a light source, and is directly polarized in the Y direction. The light is transmitted through a polarization filter 81, which transmits only the light that is directly polarized in the Y direction, and is separated into one main beam and two sub beams by a grating 82. The light incident to a polarization beam splitter 83 is divided into a straight direction and a direction of a front monitor 84. The front monitor monitors the ratio of the quantity of light traveling to the optical disk side to the quantity of light that is received in the front monitor, and performs light quantity control so that the ratio becomes constant on the semiconductor laser side through a control circuit (not illustrated).

The light that is directly transmitted through the polarization beam splitter becomes a parallel light through the collimator lens 22, and is changed from the linear polarized light to a circularly polarized light by a ¼ wavelength plate 23. The circular polarization may be, for example, a circular polarization turning to the right. The light incident to an object lens 24 is condensed on the information recording surface 25a of an optical disk 25, and the light reflected from the information recording surface becomes a circularly polarized light rotating to the left to be transmitted through the object lens 24. The light transmitted through a ¼ wavelength plate 23 becomes a light that is directly polarized in the X direction, is transmitted through the collimator lens 22, and then is again incident to the beam splitter 83. The light that is directly polarized in the X direction is condensed in a direction of a light receiving device 65 by the beam splitter, and thus the recorded information of the optical disk can be read.

Although it is exemplified that the semiconductor layer becomes a linear polarized light that oscillates in a constant direction so that it is in the Y direction in the optical head device 80, the direction of the linear polarized light differs due to individual differences such as temperature, laser, or the like. That is, the light of the component in the X direction is also revealed according to the conditions. Accordingly, in order to make the ratio of the light quantity received in the front monitor 84 to the light quantity separated into the side of the optical disk 25 constant, it is necessary to place the polarization filter 81 close to the semiconductor laser to remove the individual differences in the polarization direction of the light emitted from the semiconductor laser.

As the polarization filter 81 the liquid crystal element in the first embodiment and in the second embodiment may be used. For example, it is assumed that the period direction of the diffraction grating is the X direction, and the refractive index $n_o$ for ordinary light of the liquid crystals and the refractive index of the isotropic optical material 33 are made to coincide with each other. The light that is polarized in the Y direction becomes the refractive index for ordinary light in the liquid crystal layer, while the light having the component in the X direction becomes the refractive index for extraordinary light in the liquid crystal layer. Since the diffraction occurs due to the difference between the refractive index of the optical material and the refractive index for ordinary light, the light that travels in a straight direction almost becomes the linear polarized light of the Y-direction component. For example, by making the wavelength of the incident light λ [nm] and making the difference in length between paths of the light which is polarized in the X direction and is transmitted through the convex portion of the liquid crystal element and the light which is polarized in the X direction and is transmitted through the concave portion $(2m+1)\lambda/2$ [nm] (where m is an integer of $m \geq 0$), the diffraction efficiency becomes maximum and thus the direct transmitted light is not generated. Accordingly, the liquid crystal element can functions as a polarization filter which directly transmits the light in a specified polarization direction and which does not directly transmit the light in a polarization direction that is orthogonal to the above-described polarization direction.

Also, in the case of functioning as a polarization filter, the polarization component of the light that does not directly travel may be made to travel (deflect) in a direction other than the straight direction by the diffraction operation. Even in this case, it is difficult for the polarization component of the light, in which a portion having a large diffraction angle is unnecessary, to become a stray light in the optical components using the directly transmitted polarization component, and thus it is preferable. As described above, in order to extend the diffraction angle, it is preferable to use a liquid crystal element having a small grating pitch of the diffraction grating. By using the liquid crystal element that adjust the alignment direction of the liquid crystals according to an embodiment of the present invention, good optical characteristics can be obtained even without extending the aspect ratio, high-quality polarization filter can be realized, and thus high-quality optical head device can be realized.

Fifth Embodiment

Figure 12A:
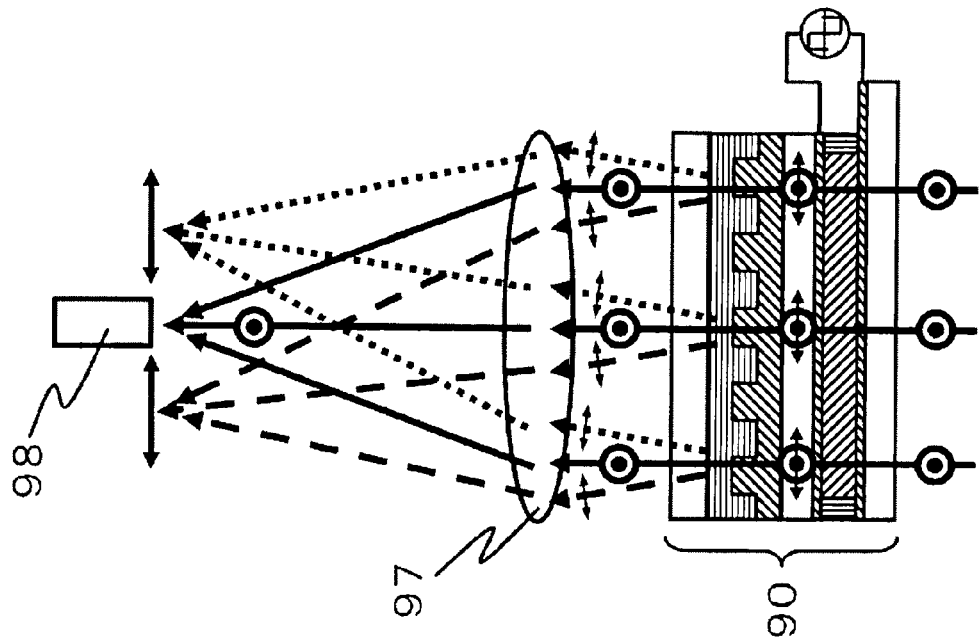
FIGS. 12A and 12B are cross sectional diagrams illustrating a variable optical modulation element using a liquid crystal element according to a first embodiment.

FIG. 12A is a diagram illustrating a cross section of a variable optical modulation element 90 in the fifth embodiment, which includes the liquid crystal element 30a in the first embodiment. In this case, the variable optical modulation element 90 may include the liquid crystal element in the second embodiment in addition to the liquid crystal element 30a in the first embodiment. Also, the variable optical modulation element 90 shares the transparent substrate 31b, and is provided with a transparent conductive layer 94a on the surface opposite to the liquid crystal layer 32 of the transparent substrate 31b. Further, a liquid crystal layer 93 with a predetermined thickness is interposed between the transparent conductive layer 94a and a transparent conductive layer 94b formed on one surface of the transparent substrate 92, and a sealant 95 is formed on a peripheral portion of the liquid crystal layer 93. Also, a voltage control device 96, which controls the polarization state of the transmitted light by applying a voltage to the liquid crystal layer 93 through the transparent conductive layers 94a and 94b is provided. Also, the configuration that includes (a portion of) the transparent substrate 31b, the transparent conductive layer 94a, the liquid crystal layer 93, the transparent conductive layer 94, and the transparent substrate 92 becomes a liquid crystal cell 91.

In this case, on the surface of the second liquid crystal layer 93 of the transparent substrates 31b and 92, an alignment layer (not illustrated) is provided, and it is assumed that the alignment direction of the alignment layer of the transparent substrate 92 is the Y direction, and the alignment direction of the alignment layer of the transparent substrate 31b on the side of the liquid crystal layer 93 is the X direction. When the voltage is not applied to the liquid crystal layer 93 of the liquid crystal cell 91 (hereinafter referred to as "when no voltage is applied"), it is assumed that the liquid crystal molecules are twisted by 90° in a thickness direction. Also, when the voltage is applied to the liquid crystal layer 93 (hereinafter referred to as "when voltage is applied"), the longitudinal direction of the liquid crystal molecules is in parallel to the direction of electric field (i.e. Z direction).

Figure 12B:
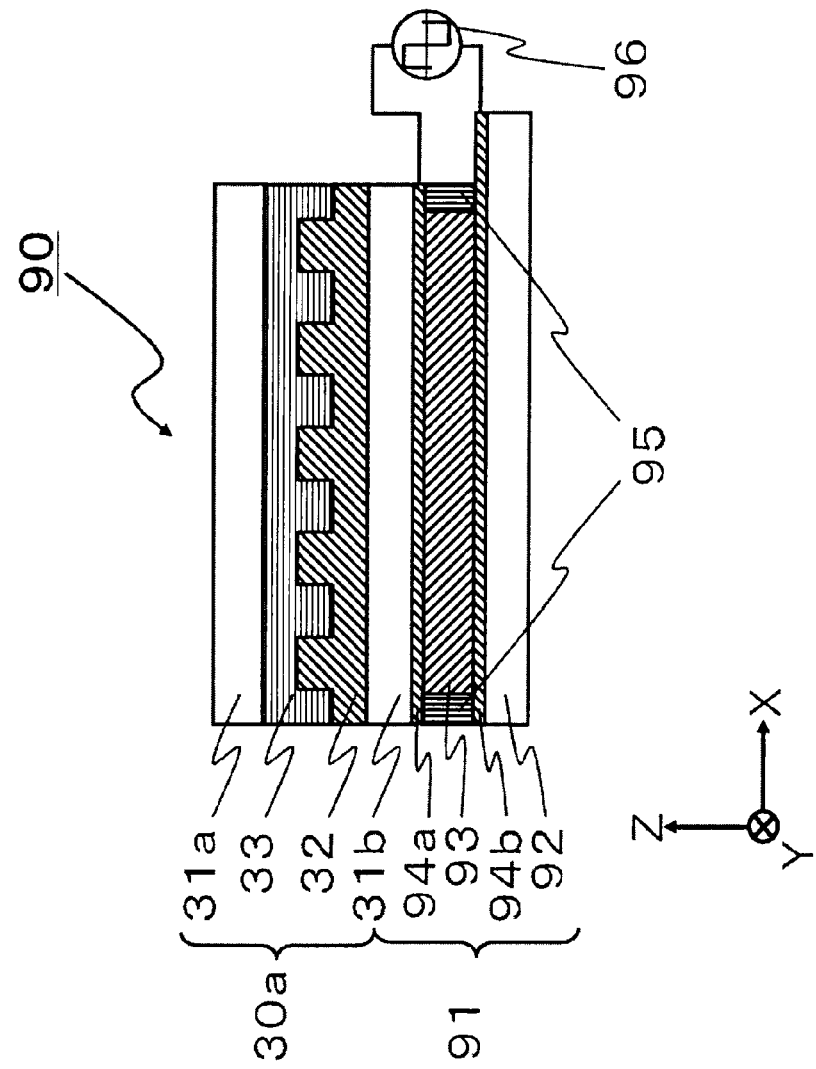

Next, the operation of the variable optical modulation element 90 when voltage or no voltage is applied will be described. FIG. 12B is a diagram illustrating that the polarized light in the Y direction is incident to the variable optical modulation element 90. First, when no voltage is applied, the liquid crystal molecules of the liquid crystal layer 93 are twisted, and thus the polarized light in the Y direction, which travels from the transparent substrate 92 to the Z direction becomes the polarized light in the X direction in the liquid crystal layer 93. Also, the polarized light in the X direction is diffracted by the diffraction grating of the liquid crystal element 30a. The light that is transmitted through the variable optical modulation element 90 is incident to the condenser lens 97, but is not focused, for example, on the position of a light receiving device 98 such as optical fiber or the like. In this case, by extending the diffraction angle through the diffraction grating 30, the diffracted light that is unnecessary is far apart from the light receiving device 98 when no voltage is applied, and thus the quantity of light that is incident as the stray light can be reduced.

On the other hand, when the voltage is applied, the longitudinal direction of the liquid crystal molecules of the liquid crystal layer 93 is aligned in the thickness direction that is the direction of the electric field, and the polarized light in the Y direction is transmitted through the liquid crystal layer 93 without changing the polarization state, and is incident to the liquid crystal element 30a. Since the liquid crystal element 30a also directly transmits the polarized light in the Y direction, the light is steadily condensed on the light receiving device 98 by the condenser lens 97. The quantity of light that is incident to the light receiving device 98 can be controlled by the level of the applied voltage by the voltage control device 96, the pitch of the diffraction grating can be narrowed (or shortened) by using the liquid crystal element according the embodiments of the present invention, and thus the diffraction angle of the diffracted light can be extended. Accordingly, when the voltage is not applied, the stray light that is incident to the light receiving device 98 can be greatly reduced to heighten the extinction ratio.

Also, the variable optical modulation element 90 as illustrated in FIG. 12A is exemplary, and the structure of the liquid crystal element is not limited thereto. For example, polymer liquid crystals may be used in the liquid crystal layer 32, or the diffraction grating structure may be in an (analogous) blazed shape. Although the liquid crystals of the liquid crystal layer 93 of the liquid crystal cell 91 may have a positive dielectric anisotropy $\Delta\in$, the polarity of the dielectric anisotropy that the liquid crystals of the liquid crystal layer is not limited thereto, and the liquid crystals in the liquid crystal layer 93 may have a negative dielectric anisotropy $\Delta\in$, so that when no voltage is applied, the liquid crystals of the liquid crystal layer have the characteristics in that they are aligned approximately in the horizontal direction on the transparent substrate when a voltage is applied. Further, in FIG. 12B, although it is exemplified that the light receiving device 98 is arranged in a direction where the variable optical modulation element 90 directly transmits the light, the light receiving device may be arranged in a direction where the diffracted light travels. Also, a reflective layer (not illustrated) may be installed on the variable optical modulation element 90, and for example, the light emitted from one optical fiber is reflected to receive the reflected light. Further, for example, the number of liquid crystal elements 30a having diffraction gratings is not limited to 1, and two liquid crystal elements may be constructed to overlap each other.

Example 1

Figure 13:
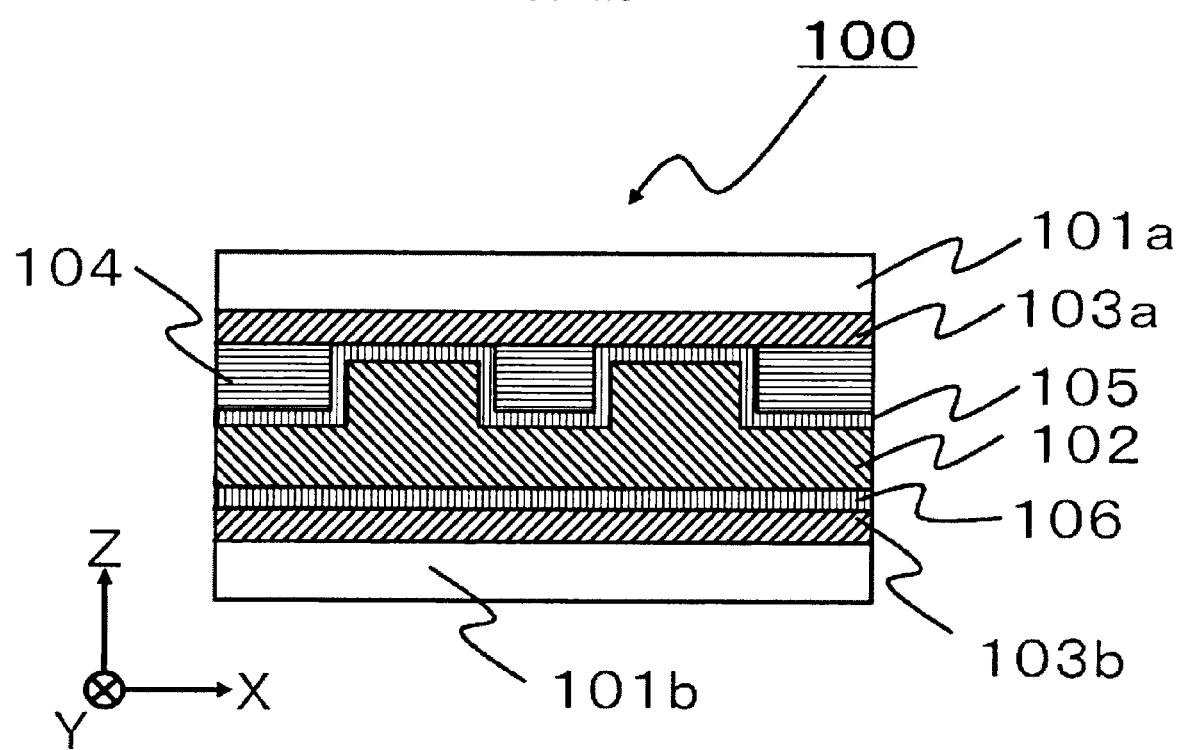
FIG. 13 illustrates a liquid crystal element according to a first example.

As an example of the present invention, the liquid crystal element 100 shown in FIG. 13 was made. A quartz substrate with a thickness of 0.5 mm was cleaned, and a transparent substrate 101b was prepared, on one surface of which an anti-reflection layer (not illustrated) was formed. A transparent conductive layer 103b formed of ITO was formed on an opposite surface of an anti-reflection layer of the transparent substrate by sputtering. A $SiO_2$ layer was formed on the transparent conductive layer 103b as an insulating layer (not illustrated), polyimide was spread thereon, and a horizontal alignment processing was performed by rubbing through an annealing process to form an alignment layer 106.

In the same manner, a quartz substrate with a thickness of 0.5 mm was cleaned, and a transparent substrate 101a was prepared, on one surface of which an anti-reflection layer (not illustrated) was formed. Also, a transparent conductive layer 103a made of ITO was formed on the other surface of the transparent substrate 101a. After a $SiO_2$ layer was formed on the ITO layer 103a as an insulating layer (not illustrated), a SiON layer with a thickness of about 1.35 μm was deposited. At that time, the refractive index of the SiON layer that is made of an isotropic material was 1.51 with respect to the light of 405 nm. Resist was patterned by photolithography on the SiON surface in a grating shape in which a grating pitch of the cross section was about 2 μm, and a Duty that is a ratio of the width of a convex portion of the grating pitch to the width of a concave portion thereof was 1:1. Etching was performed so that the depth of the patterned resist was about 1.27 μm, and the resist was peeled off and ashed, so that a grating shape 104 composed of SiON was made. After polyimide to be vertically aligned was spread on the surface of the grating shape 104, an alignment layer was formed through an annealing process.

The alignment layers or aligned surfaces were made to face each other. The horizontal alignment direction of the alignment layer 106 was in parallel to the X direction, and the period direction (i.e. grating direction) of the grating in the form of a grating was the X direction. A liquid crystal layer 102 was made by spreading spacers having a diameter of about 3.5 μm (not illustrated) on the alignment layer 106, sealing a circumference of the substrate by sealant (not illustrated), injecting and filling liquid crystals into a gap formed by the spacers through inlet ports (not illustrated). For the injected liquid crystals, a material, which has the characteristics of a refractive index $n_o$ for ordinary light of $n_o=1.51$ with respect to the light of 405 nm, a refractive index $n_e$ for extraordinary light of $n_e=1.68$, and a refractive index anisotropy $\Delta n$ of $\Delta n=0.17$, was used. Also, a voltage control device (not illustrated) was connected between the transparent conductive layers 103a and 103b to apply a voltage to the liquid crystal layer 102.

The produced optical device was cut by a dicing saw in the size of about 5 mm by sides to produce a liquid crystal element having a shape that can be applied to an optical head device. After cutting, the transmission wavefront aberration of the liquid crystal element measured using a He—Ne laser having a wavelength of about 633 nm was equal to or smaller than 25 mλrms, and it was confirmed that the produced liquid crystal element can be satisfactorily used as an optical device.

Also, by making the light of 405 nm incident to the produced liquid crystal element, the diffraction characteristic was measured. When the light of 405 nm was incident in a traveling direction that is in parallel to Z axis and in a polarization direction of the X direction, the direct transmittance of the incident light was equal to or less than 10% when no voltage was applied, and ±1-order diffraction efficiency was about 40%. On the other hand, when a square AC wave voltage of 1 kHz was applied for 40 Vrms to the liquid crystal layer, the liquid crystals were driven by the voltage to change the diffraction efficiency, and the direct transmittance was equal to or larger than 90%. Accordingly, by controlling the voltage, the liquid crystal element can be used as a light quantity control device that can change the quantity of light direct transmitted.

Example 2

A liquid crystal element as illustrated in FIG. 7C was made. A quartz substrate with a thickness of 0.5 mm was cleaned, and a transparent substrate 55 was prepared, on one surface of which an anti-reflection layer (not illustrated) was formed. On an opposite surface of the anti-reflection layer, polyimide was spread, and a horizontal alignment processing was performed by rubbing through an annealing process to form an alignment layer 54. Also, a quartz substrate with a thickness of 1.0 mm was newly cleaned, and a transparent substrate 58 was prepared, on one surface of which an anti-reflection layer (not illustrated) was formed.

Resist was patterned by photolithography on the transparent substrate in a grating shape in which a grating pitch of the cross section was about 2 μm, and a duty was 1:1. Etching was performed so that the depth of the surface on which the resist was patterned becomes about 1.27 μm, and the resist was peeled off and ashed to form a mold substrate 51. On a grating-shaped surface of the mold substrate 51, silane having a purfluoro group was spread to form a vertically aligned material layer 52.

The horizontal alignment direction of the alignment layer 54 was made to be in parallel to the X direction. A polymerizable liquid crystal layer 53 was made by spreading spacers having a diameter of about 3.5 μm (not illustrated) on the alignment layer 54, sealing a circumference of the substrate by sealant (not illustrated), injecting and filling a polymerizable liquid crystal composition into a gap formed by the spacers. For the injected polymerizable liquid crystal composition, by performing polymerization using light polymerization, a material, which has the characteristics of a refractive index $n_o$ for ordinary light of $n_o=1.51$ with respect to the light of 405 nm, a refractive index $n_e$ for extraordinary light of $n_e=1.68$, and a refractive index anisotropy $\Delta n$ of $\Delta n=0.17$, was used. By making the period direction of the grating of the mold substrate 51 in parallel to X axis, the mold substrate 51 was made to overlap the polymerizable liquid crystal layer 53, and then the mold substrate 51 was pressed so that the polymerizable liquid crystal composition has a grating shape of the mold substrate.

Liquid crystal polymerization was performed by exposing the mold substrate to UV light in a state where the mold substrate was pressed. After polymerization, a liquid crystal polymer layer 56 of a diffraction grating shape as shown in FIG. 7B was formed by releasing the mold substrate. Then, on the liquid crystal polymer layer 56 as shown in FIG. 7C, polymerizable monomer, which is a transparent polymer layer 57 having the same refractive index as the refractive index for ordinary light of the liquid crystal polymer and the same temperature dependence, was filled. Thereafter, a transparent substrate 58, on which anti-reflection layer processing was performed and which has a thickness of about 0.5 mm, was opposed.

In the opposed state, transparent polymerization was performed by exposing the transparent monomer to the UV light. The produced optical device was cut by a dicing saw in the size of about 5 mm by sides to produce a liquid crystal element having a shape that can be applied to an optical head device. After cutting, the transmission wavefront aberration of the liquid crystal element determined using a He—Ne laser having a wavelength of about 633 nm was equal to or smaller than 25 mλrms, and it was confirmed that the produced liquid crystal element could be satisfactorily used as an optical device.

Also, when the light of 405 nm was incident in a traveling direction that was in parallel to Z axis and in a polarization direction of the X direction, the direct transmittance (i.e. 0-order diffraction efficiency) $\eta_o$ was equal to or less than 5%. On the other hand, when the light was incident in the polarization direction of the X direction, the direct transmittance (i.e. 0-order diffraction efficiency) $\eta_o$ was equal to or larger than 95%. Accordingly, a liquid crystal element can be realized, in which the diffraction efficiency has the incident polarization direction dependence and the aspect ratio is small.

Example 3

Using the same manufacturing method as in example 2, a liquid crystal element as illustrated in FIG. 8A is made. The length directions of diffraction gratings of a region 64 and a region 65 are made to be orthogonal to the length directions of diffraction gratings of a region 63 and a region 66, respectively. Also, under the assumption that the grating pitch is about 2 μm, the grating depth d is about 1.5 μm, and the diameter of the spread spacer is about 7.0 μm, the alignment layer (i.e. the alignment layer 54 in FIG. 8C) on the transparent substrate side that is opposite to the diffraction grating side is formed of a polyimide layer having a vertical alignment capability. Also, the polyimide layer is made without rubbing process, and other conditions are the same as those in the example 1.

As a result, when the light is incident in a polarization direction that is orthogonal to the length direction of the diffraction gratings of the regions 63 to 66, the direct transmittance (i.e. 0-order diffraction efficiency) $\eta_o$ is equal to or less than 5%. On the other hand, when the light is incident in the polarization direction that is parallel to the length direction of the diffraction grating, the direct transmittance (i.e. 0-order diffraction efficiency) $\eta_o$ is equal to or larger than 95%, and thus satisfactory effect is obtained as the patterning polarizer.

INDUSTRIAL APPLICABILITY

As described above, the liquid crystal element according to the present invention can realize the diffraction grating structure, which has a constant diffraction angle by horizontally aligning the plane which is vertically aligned and is opposite to the alignment layer of the diffraction grating surface, in low aspect ratio. Also, by changing the thickness of the liquid crystal layer that does not include the groove portion of the diffraction grating rather than changing the grating depth of the diffraction grating, the optical characteristics such as the diffraction efficiency or the like can be controlled. Further, since the liquid crystal element according to the present invention does not require the transparent conductive layer or insulating layer, high optical use efficiency can be realized without deteriorating the transmittance. Accordingly, the liquid crystal element having a high productivity and good quality can be realized, and through providing of the optical head device, it can be used as the liquid crystal element, polarization filter, or variable optical modulation element.

The invention claimed is:

1. A liquid crystal element comprising:
   a transparent substrate; and
   a liquid crystal layer formed over the transparent substrate, the liquid crystal layer comprising a liquid crystal material and having a concavo-convex portion including periodic concaves and convexes,
   wherein the concavo-convex portion of the liquid crystal layer has liquid crystal molecules of the liquid crystal material on a concavo-convex surface of the concavo-convex portion such that the liquid crystal molecules of the liquid crystal material are uniformly aligned substantially in a perpendicular direction with respect to an entire surface of the concavo-convex surface to form a diffraction grating.

2. The liquid crystal element according to claim 1, wherein the liquid crystal layer is provided between the transparent substrate and a second transparent substrate on an opposite side of the transparent substrate.

3. The liquid crystal element according to claim 1, wherein the liquid crystal layer has a leveled surface on an opposite side of the concavo-convex surface, and the liquid crystal material has liquid crystal molecules uniformly aligned on the leveled surface.

4. The liquid crystal element according to claim 3, wherein the liquid crystal molecules on the leveled surface of the liquid crystal layer are aligned substantially in a parallel direction with respect to the leveled surface of the liquid crystal layer.

5. The liquid crystal element according to claim 1, wherein the concavo-convex portion of the liquid crystal layer includes a plurality of regions in which a period direction of the concavo-convex portion of each of the regions differs.

6. The liquid crystal element according to claim 1, wherein the concavo-convex surface of the liquid crystal layer is positioned on a medium comprising an isotropic material, and a refractive index of the isotropic material is substantially the same as a refractive index $n_o$ for ordinary light or a refractive index $n_e$ for extraordinary light of the liquid crystal material.

7. An optical head device comprising:
  a light source;
  an object lens configured to condense an emitted light from the light source onto an optical recording medium;
  an optical detector configured to receive the light which is condensed and reflected by the optical recording medium; and
  the liquid crystal element according to claim 1, which is positioned within a light path between the light source and the optical recording medium or within a light path between the optical recording medium and the optical detector.

8. A variable optical modulation element comprising:
  a liquid crystal cell in which liquid crystals are interposed between a pair of transparent substrates;
  the liquid crystal element according to claim 1; and
  a voltage control device configured to change an alignment state of the liquid crystals by applying a voltage to the liquid crystals.

9. The liquid crystal element according to claim 1, wherein the liquid crystal layer is a liquid crystal polymer layer comprising a polymerized liquid crystal material and having the concavo-convex portion, the concavo-convex portion of the liquid crystal polymer layer has liquid crystal molecules of the polymerized liquid crystal material on the concavo-convex surface of the concavo-convex portion such that the liquid crystal molecules of the polymerized liquid crystal material are uniformly aligned substantially in the perpendicular direction with respect to the concavo-convex surface to form the diffraction grating.

10. The liquid crystal element according to claim 1, wherein the periodic concaves and convexes of the concavo-convex portion is a diffraction grating structure having a tetragonal cross-section.

11. The liquid crystal element according to claim 1, wherein the concavo-convex portion of the liquid crystal layer includes a plurality of regions in which a concavo-convex direction of the concavo-convex portion of the liquid crystal layer is distributed to be continuously changed.

12. The liquid crystal element according to claim 3, wherein the liquid crystal molecules on the leveled surface of the liquid crystal layer are uniformly aligned substantially in a perpendicular direction with respect to the leveled surface of the liquid crystal layer.

13. The liquid crystal element according to claim 1, wherein the liquid crystal layer has a second concave-convex surface on an opposite side of the concavo-convex surface of the concavo-convex portion, and the liquid crystal molecules of the liquid crystal material are uniformly aligned substantially in a perpendicular direction with respect to the second concave-convex surface.

* * * * *